United States Patent
Iwamatsu et al.

[19]

[11] Patent Number: 5,805,315
[45] Date of Patent: Sep. 8, 1998

[54] HOLOGRAPHIC SCANNER INCLUDING A ROTARY HOLOGRAM DISK BETWEEN A FRONT HOLOGRAM AND A REAR HOLOGRAM

[75] Inventors: Tadashi Iwamatsu; Tetsuro Toyoshima, both of Nara, Japan

[73] Assignee: Sharp Kabushiki Kaisha, Osaka, Japan

[21] Appl. No.: 856,954

[22] Filed: May 15, 1997

Related U.S. Application Data

[62] Division of Ser. No. 440,211, May 12, 1995, Pat. No. 5,680,232, which is a continuation of Ser. No. 27,137, Mar. 5, 1993, abandoned.

[30] Foreign Application Priority Data

| Mar. 5, 1992 | [JP] | Japan | 4-48864 |
| Mar. 17, 1992 | [JP] | Japan | 4-92058 |
| Mar. 31, 1992 | [JP] | Japan | 4-108755 |
| Mar. 31, 1992 | [JP] | Japan | 4-108756 |
| Apr. 2, 1992 | [JP] | Japan | 4-110899 |

[51] Int. Cl.$^6$ .............................. G02B 5/18; G02B 5/32; G03H 1/08
[52] U.S. Cl. .............................. 359/18; 359/571; 359/574
[58] Field of Search .................................. 359/18, 17, 16, 359/15, 571, 574

[56] References Cited

U.S. PATENT DOCUMENTS

| 4,428,643 | 1/1984 | Kay . |
| 4,810,046 | 3/1989 | Yamagishi et al. . |
| 4,925,262 | 5/1990 | Yamagishi et al. . |
| 4,957,336 | 9/1990 | Hasegawa et al. . |
| 4,973,112 | 11/1990 | Kramer . |
| 5,009,502 | 4/1991 | Shih et al. . |
| 5,039,183 | 8/1991 | Meyers ...................................... 359/17 |
| 5,182,659 | 1/1993 | Clay et al. ............................... 359/18 |

FOREIGN PATENT DOCUMENTS

| 0 334 631 | 9/1989 | European Pat. Off. . |
| 58-72120 | 4/1983 | Japan . |
| 60-11816 | 1/1985 | Japan . |
| WO 92/02843 | 2/1992 | WIPO . |
| WO 92/15028 | 9/1992 | WIPO . |

OTHER PUBLICATIONS

Ono et al., "Holographic disk scanners for bow–free scanning" *Applied Optics* (1983) 22:2132–2136.

Funoto et al., "Holographic scanner for laser printer" *Ricoh Technical Report* (Dec., 1983), NO. 10, pp. 10–15. An English abstract and partial translation were previously submitted.

*Primary Examiner*—Jon W. Henry
*Attorney, Agent, or Firm*—Morrison & Foerster, LLP

[57] ABSTRACT

A holographic scanner for scanning a surface with a light beam is provided. The holographic scanner includes a light source for emitting light used as the light beam, a front hologram for diffracting the light emitted from the light source to produce a first diffracted beam, a rotary hologram disk having a disk plane and rotatable around an axis thereof vertical to the disk plane, the rotary hologram disk including a plurality of scanning holograms arranged on the disk plane in a circumferential direction, the scanning holograms diffracting the first diffracted beam to produce a second diffracted beam, and a rear hologram for diffracting the second diffracted beam to produce a third diffracted beam, the third diffracted beam being used as the light beam for illuminating the scanning plane.

16 Claims, 16 Drawing Sheets

Fig. 10A Pitch = 2.6 μm O-A section
Fig. 10B Pitch = 18.7 μm O-B section
Fig. 10C Pitch = 2.6 μm O-A section

HOLOGRAPHIC SCANNER INCLUDING A ROTARY HOLOGRAM DISK BETWEEN A FRONT HOLOGRAM AND A REAR HOLOGRAM

This application is a division of application Ser. No. 08/440,211, filed May 12, 1995, now U.S. Pat. No. 5,680,232 which is a continuation of application Ser. No. 08/027,137, filed Mar. 5, 1993, now abandoned.

BACKGROUND OF THE INVENTION

1. Field of the Invention

The present invention relates to a holographic scanner, and more particularly to a holographic scanner suitably used for a laser beam printer or the like.

2. Description of the Related Art

A holographic scanner has been used for a laser beam printer or the like. Such a holographic scanner includes a rotary hologram disk for deflecting light beams to effect optical scanning on a plane such as a surface of a photosensitive drum.

Such a rotary hologram disk includes a plurality of holograms arranged in a circumferential direction on a disk-shaped plate. The rotary hologram disk is rotated around the axis thereof vertical to the disk plane by a drive means such as a motor at a predetermined speed.

The operation of a conventional holographic scanner will be briefly described with reference to FIG. 19.

FIG. 19 schematically shows a conventional holographic scanner. A light beam L1 emitted from a semiconductor laser 71 is introduced to one of holograms 731 formed on a hologram disk 73 through a collimator lens 72. The light beam L1 is diffracted from the hologram 731 as a diffracted beam L2. The diffracted beam L2 illuminates a scanning plane 74 placed at a predetermined position to form a light spot on the scanning plane 74. As the hologram disk 73 rotates, the direction of the diffracted beam L2 varies. This causes the light spot to move on the scanning plane 74 with the rotation of the hologram disk 73, thus effecting optical "primary scanning" to form a scanning line on the scanning plane 74. Further, the scanning plane 74 moves in a direction vertical to the direction of the primary scanning to effect "secondary scanning". (Hereinafter, the direction in which the light spot moves with the rotation of the hologram disk is referred to as a "primary scanning direction", and the direction vertical to the primary scanning direction is referred to as a "secondary scanning direction".)

In addition to the function of diffracting the light beam L1, the hologram 731 is also provided with functions of converging the diffracted beam L2 on the scanning plane 74 to form an image thereon and performing "fθ correction" to allow the diffracted beam L2 to move on the scanning plane 74 at a uniform speed. Thus, since the number of optical components can be reduced, the holographic scanner can be made small and thin easily, and the cost thereof can be reduced, compared with other optical scanners employing a polygonal mirror or the like as deflecting means.

Conventional holographic scanners generally include one or two hologram plates. For example, holographic scanners including only a rotary hologram disk are described in Y. Ono and N. Nishida, "Holographic disk scanners for bow-free scanning", Applied Optics, vol. 22, No. 14/15, July 1983 and H. Funato, "Holographic scanner for laser printer", Ricoh Technical Report, No. 10, December 1983.

As for the holographic scanners using two hologram plates, those including a rotary hologram disk and a front hologram which is immobilized at a position in front of the rotary hologram disk closer to the light source are disclosed, for example, in Japanese Patent Publication No. 2-47726 and Japanese Laid-Open Patent Publication No. 62-234118. As another example, a holographic scanner including a rotary hologram disk and a rear hologram immobilized at a position in the rear of the rotary hologram disk is disclosed in Japanese Laid-Open Patent Publication No. 60-11817.

Generally, requirements for a light beam scanner such as the holographic scanner are to converge scanning beams on a scanning plane so as to form a sufficiently small spot thereon, to minimize the bow of the scanning line, and to scan the scanning plane with the scanning beams at a uniform speed.

As described above, the hologram scanner effects optical scanning by using the diffraction of light. The diffraction angle of light from a hologram greatly depends on the wavelength of the light incident to the hologram as is shown by the equation:

$$\sin\theta_{in} + \sin\theta_{out} = n \cdot \lambda / d \tag{1}$$

where $\theta_{in}$ is the incident angle, $\theta_{out}$ is the diffraction angle, n is the order of diffraction, $\lambda$ is the light wavelength, and d is the grating pitch of the hologram.

Accordingly, when the wavelength of light emitted from a light source varies, the diffraction angle of the light varies. As a result, the position of the light spot (image) formed on the scanning plane is deviated from a predetermined position, causing the bow of the scanning line and the deviation of the height of the formed image.

Generally, a light source normally used for the holographic scanner emits light of which wavelength more or less varies depending on the change in the environmental temperature and the operating conditions. Especially, the wavelength of light emitted from a semiconductor laser may vary to such an degree that can not be neglected depending on the temperature characteristics and the operating conditions of the semiconductor laser. For this reason, stable scanning unaffected by the variation in the wavelength is particularly required for the holographic scanner, compared with other light beam scanners employing a polygonal mirror or the like.

To solve this problem, there are proposals of disposing a linear grating (Japanese Patent Publication No. 2-47726) and a dispersive prism (Japanese Laid-Open Patent Publication No. 60-11816) between the collimator lens 72 and the hologram disk 73.

In the case of the holographic scanner including only a rotary hologram disk, it is difficult to prevent the bow of the scanning line and at the same time effect the scanning at a uniform speed. Moreover, as described above, the deviation of an image formed on the scanning plane from a predetermined position is significantly large both in the primary scanning direction and the secondary scanning direction.

In the case of the holographic scanner including a rotary hologram disk and a front hologram, the deviation of the image position on the scanning plane in the secondary scanning direction is markedly reduced, but the deviation of the image position in the primary scanning direction can not be reduced. Further, it is difficult to prevent the bow of the scanning line and at the same time effect scanning at a uniform speed. To effect the uniform-speed scanning, provision of an expensive lens system for image formation such as an fθ lens is additionally required. As a result, the size of the scanner becomes large and the cost thereof increases.

In the case of the holographic scanner including a rotary hologram disk and a rear hologram, scanning at a uniform speed is possible by use of the rear hologram. Accordingly, it is possible to improve image formation properties of the scanning beams, to prevent the bow of the scanning line, and at the same time to effect the uniform-speed scanning without using an expensive lens system for image formation such as a fθ lens. However, the deviation of the image position on the scanning plane caused by the variation in the wavelength of the light emitted from a light source can not be sufficiently solved.

In the case of the holographic scanner disclosed in the aforementioned Japanese Laid-open Patent Publication No. 60-11817, one or both of waves for producing the rear hologram are required to have spherical aberration. For this purpose, a special optical arrangement is required for producing a hologram.

The intensity distribution of the light beams emitted from a semiconductor laser is generally represented by the Gaussian distribution. Referring to FIG. 19, when the shape of the light beam L1 incident to the hologram 731 is elliptic, the spot shapes of the diffracted beam L2 at the scan center and at the scan ends on the scanning plane 74 are largely different from each other. This difference is conventionally corrected by setting the radius of the collimator lens 72 smaller than that of the light beam L1 emitted from the semiconductor laser 71. Thus, only the center portion of the elliptic light beam is allowed to pass through the collimator lens 72 and therefore the shape of the light beam L1 is changed from the ellipse to a complete round.

In the above-described conventional holographic scanner, however, since the coupling efficiency of the collimator lens 72 for the light output of the semiconductor laser 71 is low, a considerably large amount of light energy is lost when the light beam L1 is shaped by the collimator lens 72. To compensate this energy loss, a semiconductor laser having a larger output is required, which results in cost increase. If a dispersive prism which is more expensive than a general prism is employed, the cost of the entire device further increases.

An other problem arising in conventional holographic scanners is that the hologram disk may be decentered or shifted when it rotates. As a result, the position of the image on the scanning plane is deviated. This problem will be described with reference to FIG. 18.

Referring to FIG. 18, a hologram 61 for scanning is disposed on a hologram disk 60 in a circumferential direction. The hologram 61 has a predetermined pattern of interference fringes formed thereon. The hologram disk 60 rotates around a rotational axis A.

Light beams L1a, L1b, and L1c (generically referred to as L1) are introduced to the hologram 61 at an incident angle $\theta_{in}$ and are diffracted therefrom as diffracted beams L2a, L2b, and L2c (generically referred to as L2) at diffraction angles $\theta_{outa}$, $\theta_{outb}$, $\theta_{outc}$ (generically referred to as $\theta_{out}$), respectively, so as to be converged on a scanning plane 70. The pitches d of the interference fringes on the hologram 61 at the incident positions of the light beams L1a, L1b, and L1c are denoted as da, db, and dc, respectively.

The incident angle $\theta_{in}$ and the diffraction angle $\theta_{out}$ have a relationship represented by equation (1). As is shown in FIG. 18, since the pitches d of the interference fringes on the hologram 61 are set to satisfy da>db>dc, the relationship between the diffraction angles is $\theta_{outa} < \theta_{outb} < \theta_{outc}$ according to equation (1). Thus, due to the converging power of the hologram 61, the diffracted beams L2a, L2b, and L2c are converged to a point on the scanning plane 70.

When the hologram disk 60 is decentered or shifted by a distance Δx in the direction shown by arrow B, the incident positions of the light beams L1a, L1b, and L1c on the hologram 61 are also shifted. Since the pitches of the interference fringes on the hologram 61 differ gradually in the radial direction of the hologram 61, the diffraction angle $\theta_{out}$ varies greatly as the incident position of the incident light beam L1 is shifted. This causes a significant deviation of the image formation point on the scanning plane 70.

Efforts for minimizing decentering or shifting of the hologram disk are required to solve this trouble. However, when the holographic scanner is applied to a laser beam printer or other high-precision apparatuses, some means must be provided to prevent such deviation of the image formation point on the scanning plane when the hologram disk is actually decentered or shifted.

Japanese Laid-Open Patent Publication No. 58-72120 discloses a method for preventing such deviation of the image formation point on the scanning plane. According to this method, the shape of light beams emitted from a light source are made elongate in the radial direction of a hologram disk. Further, a concave mirror and a cylindrical lens are additionally disposed between the hologram disk and the scanning plane so that the hologram plane on the hologram disk and the scanning plane can have a conjugate relationship with each other on a plane crossing the scanning direction.

However, optical lenses such as a cylindrical lens are expensive and heavy. This is disadvantageous in realizing a light-weight and inexpensive holographic scanner.

SUMMARY OF THE INVENTION

The holographic scanner for scanning a scanning surface with a light beam according to the present invention includes: a light source for emitting light used as the light beam; a front hologram for diffracting the light emitted from the light source to produce a first diffracted beam; a rotary hologram disk having a disk plane and rotatable around an axis thereof vertical to the disk plane, the rotary hologram disk including a plurality of scanning holograms arranged on the disk plane in a circumferential direction, the scanning holograms diffracting the first diffracted beam to produce a second diffracted beam; and a rear hologram for diffracting the second diffracted beam to produce a third diffracted beam, the third diffracted beam being used as the light beam for illuminating the scanning plane.

Alternatively, the holographic scanner for scanning a scanning surface with a light beam according to the present invention includes: a light source for emitting light used as the light beam; a front hologram for diffracting the light emitted from the light source to produce a first diffracted beam; and a rotary hologram disk having a disk plane and rotatable around an axis thereof vertical to the disk plane, the rotary hologram disk including a plurality of scanning holograms arranged on the disk plane in a circumferential direction, the scanning holograms diffracting the first diffracted beam to produce a second diffracted beam; wherein the spot shape of the first diffracted beam is made elliptically elongated in the optical scanning direction, so that the spot shape on the scanning holograms is substantially completely round.

Thus, the invention described herein makes possible the advantages of (1) providing a holographic scanner capable of improving the image formation properties of scanning beams, minimizing the bow of the scanning line, and effecting the scanning at a uniform speed even when the wavelength of light beams from a light source varies, (2) providing a holographic scanner which can be easily manufactured due to a simple design of the holograms, (3) providing a holographic scanner capable of minimizing the deviation of an image formation point on the scanning surface caused by decentering or shifting of the hologram disk, (4) providing a holographic scanner capable of minimizing the difference of the spot shapes at the scan center and the scan ends on the scanning surface, (5) providing a holographic scanner capable of reducing the loss of light energy when a light beam emitted from a light source is shaped, and (6) providing a holographic scanner which can be made small and manufactured at low cost.

These and other advantages of the present invention will become apparent to those skilled in the art upon reading and understanding the following detailed description with reference to the accompanying figures.

DESCRIPTION OF THE PREFERRED EMBODIMENTS

EXAMPLE 1

A first example of the holographic scanner according to the present invention will be described with reference to FIGS. 1 to 8.

Figure 1:
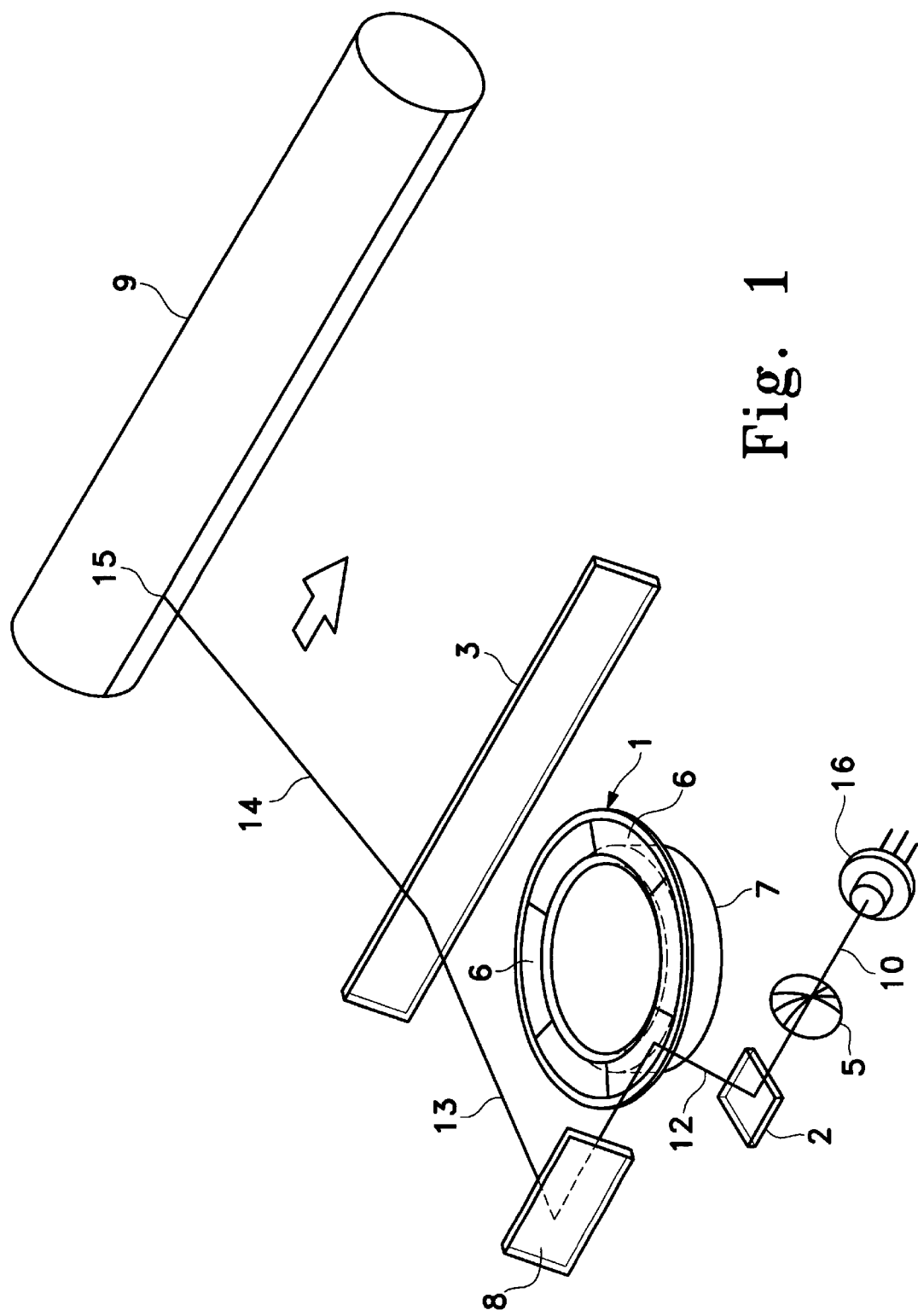
FIG. 1 is a structural perspective view of a holographic scanner according to the present invention.

Referring to FIG. 1, a light beam 10 emitted from a semiconductor laser 16 passes through a collimator lens 5, and is then introduced to a front hologram 2. The front hologram 2 diffracts the light beam 10 to produce a first diffracted beam 12, which is then introduced to a rotary hologram disk 1 having a plurality of scanning holograms 6 arranged on a surface thereof in a circumferential direction. The first diffracted beam 12 is diffracted from the rotary hologram disk 1 as a second diffracted beam 13. The second diffracted beam 13 is reflected from a mirror 8 and introduced to a rear hologram 3 where it is diffracted as a third diffracted beam 14. The third diffracted beam 14 is then converged onto an image formation point 15 on a scanning plane 9 of a photosensitive drum, for example.

The rotary hologram disk 1 is rotated by a motor 7. As the rotary hologram disk 1 rotates, the image formation point 15 moves linearly on the scanning plane 9, thereby effecting optical scanning.

Figure 2:
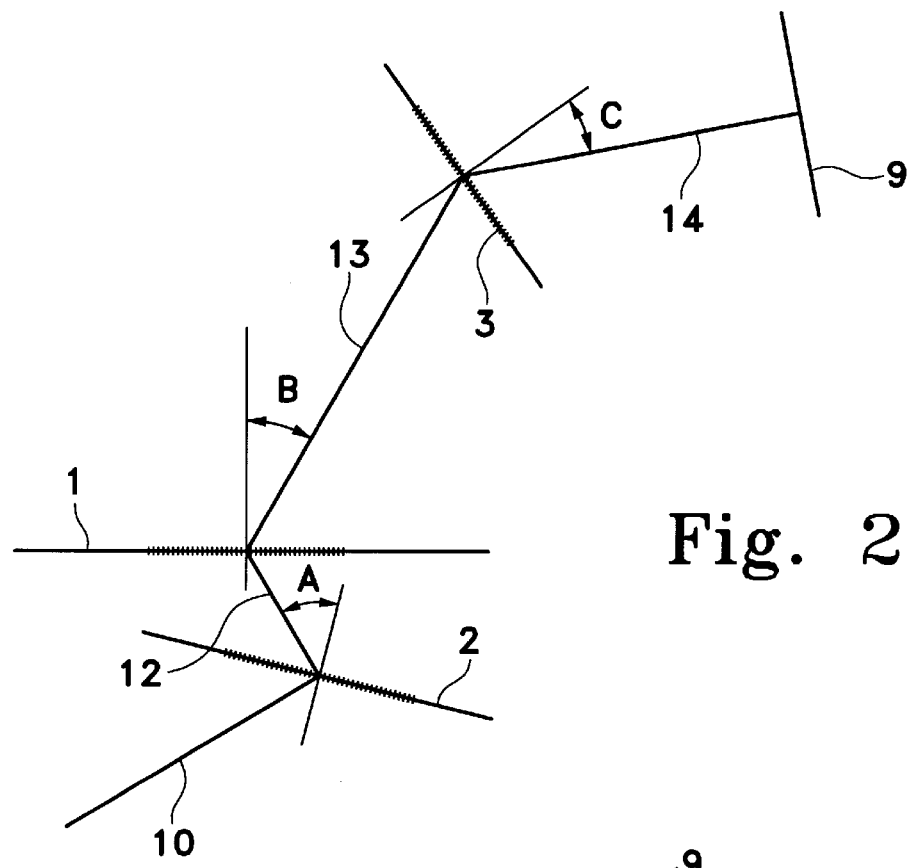
FIG. 2 shows an optical path of the principal ray on the meridional plane at the scan center for the holographic scanner according to the present invention.

FIG. 2 shows an optical path of the principal ray at the scan center on the meridional plane for the holographic scanner of this example. The light beam 10 collimated with the collimator lens 5 is diffracted from the front hologram 2 as the first diffracted beam 12 at a diffraction angle A leftward with regard to the direction of the light beam 10. The first diffracted beam 12 is introduced to the rotary hologram disk 1 and diffracted as the second diffracted beam 13 at a diffraction angle B rightward with regard to the direction of the first diffracted beam 12. At each of the above diffractions, the incident angle and the diffraction angle are set to substantially satisfy the Bragg condition, i.e., to be substantially equal to each other, for the purpose of increasing the diffraction efficiency or the like.

In the case exemplified in FIG. 2, the diffraction angle B is smaller than the diffraction angle A. Accordingly, the direction of the third diffracted beam 14 from the rear hologram 3 is right with regard to the direction of the second diffracted beam 13, which is the same as the direction of the second diffracted beam 13 from the rotary hologram disk 1.

Next, with reference to FIGS. 3 to 7, basic behaviors of light beams in the holographic scanner of this example when the wavelength thereof varies will be described by comparing it with those in conventional holographic scanners.

Figure 3:
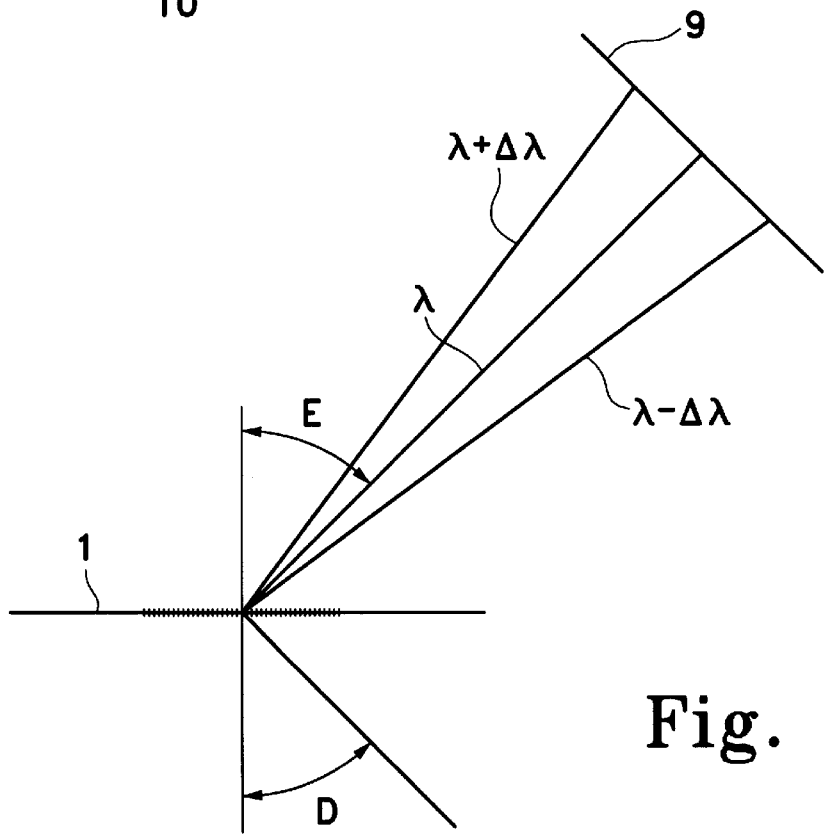
FIG. 3 shows an optical path of the principal ray on the meridional plane at the scan center when the wavelength varies for a holographic scanning including only a rotary hologram disk.

FIG. 3 shows an optical path of the principal ray at the scan center on a meridional plane for a holographic scanner including only the rotary hologram disk 1. A first-order diffracted beam of a light beam with a wavelength $\lambda$ introduced to the rotary hologram disk 1 at an incident angle D is diffracted therefrom at a diffraction angle E according to the equation:

$$\sin D + \sin E = \lambda/d \qquad (2)$$

where D is the incident angle, E is the diffraction angle, λ is the wavelength, and d is the grating pitch of the hologram, so as to reach the scanning plane 9 of the photosensitive drum, for example.

When the wavelength λ of the light beam emitted from a semiconductor laser is 780 nm, the incident angle D is 45°, and the grating pitch d is 0.55 μm, the diffraction angle E is 45.3° according to equation (2). When the wavelength λ changes by 1 nm to be 781 nm, the diffraction angle E is then calculated to be 45.5°. Assuming that the distance between the rotary hologram disk 1 and the scanning plane 9 is 400 mm, the deviation η1 of the image formation point on the scanning plane 9 in the secondary scanning direction is 1.4 mm as calculated according to the equation:

$$\eta 1 = h1 \cdot \tan(\theta 1\theta 2) \quad (3)$$

where η1 is the deviation of the image formation point in the secondary scanning direction, h1 is the distance between the rotary hologram disk 1 and the scanning plane 9, θ1 is the diffraction angle when the wavelength is 781 nm, and θ2 is the diffraction angle when the wavelength is 780 nm.

As described above, in the holographic scanner including only the rotary hologram disk 1, the deviation η1 of the image formation point on the scanning plate 9 caused by the variation of the wavelength of the light beams emitted from the light source in the secondary scanning direction is significantly large. In FIG. 3, λ, +Δλ and λ-Δλ show the directions of the first-order diffracted beams diffracted from the rotary hologram disk 1 when the wavelengths λ of the beams is changed by ±Δλ, respectively.

Figure 4:
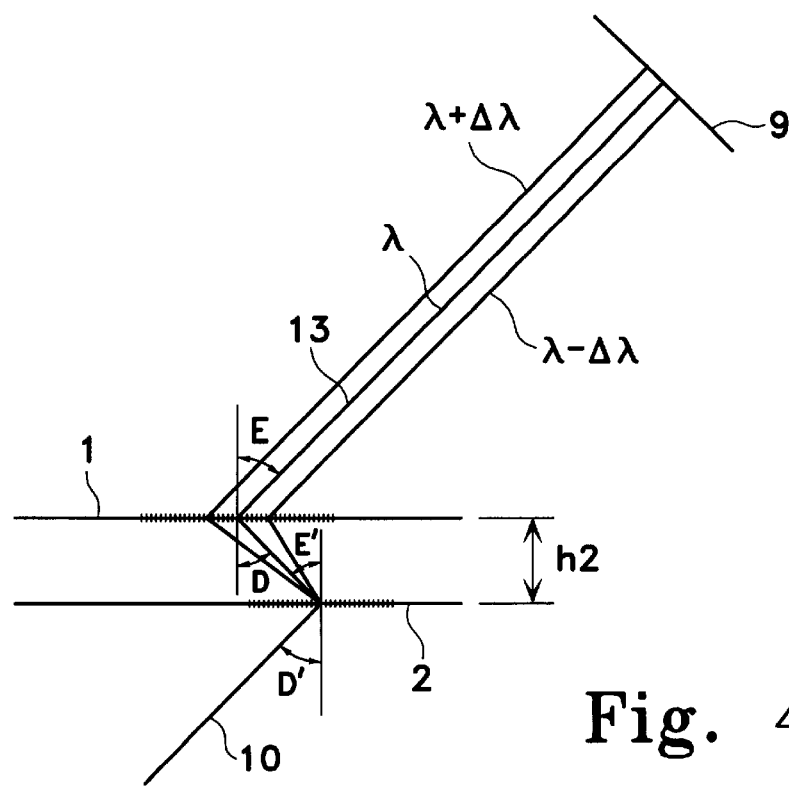
FIG. 4 shows an optical path of the principal ray on the meridional plane at the scan center when the wavelength varies for a holographic scanning including the rotary hologram disk and a front hologram.

FIG. 4 shows an optical path of the principal ray at the scan center on a meridional plane for a conventional holographic scanner including the rotary hologram disk 1 and the front hologram 2. In this case, the rotary hologram disk 1 and the front hologram 2 are disposed in parallel with each other, and the grating pitches d thereof are identical to each other. Such gratings have a uniform pitch.

In this case, when equation (2) is used for the calculation of both the rotary hologram disk 1 and the front hologram 2, the result is that the light beam 10 incident to the front hologram 2 and the second diffracted beam 13 output from the rotary hologram disk 1 are parallel with each other. This is a basic configuration where the diffraction angle E does not change even when the wavelength of the light beam varies.

When the wavelength λ of the light beam emitted from the light source is 780 nm, the incident angle D' is 45°, and the grating pitch d of the front hologram 2 is 0.55 μm, the diffraction angle E' from the front hologram 2 is 45.3° according to equation (2). When the wavelength λ changes by 1 nm to be 781 nm, the diffraction angle E' of the front hologram 2 is calculated to be 45.5°. Assuming that the distance between the front hologram 2 and the rotary hologram disk 1 is 10 mm, a deviation η2 on the rotary hologram disk 1 in the secondary scanning direction is 70 μm as calculated according to the equation:

$$\eta 2 = h2 (\tan\Theta 3 - \tan\theta 4) \quad (4)$$

where η2 is the deviation of the beam spot on the rotary hologram disk 1 in the secondary scanning direction, h2 is the distance between the front hologram 2 and the rotary hologram disk 1, θ3 is the diffraction angle when the wavelength is 781 nm, and θ4 is the diffraction angle when the wavelength is 780 nm.

Further, a deviation η3 of the image formation point on the scanning plane 9 is 50 μm as calculated by the equation:

$$\eta 3 = \eta 2 \cdot \sin\theta 5 \quad (5)$$

where η2 is the deviation of the beam spot on the rotary hologram disk 1 in the secondary scanning direction, η3 is the deviation of the image formation point on the scanning plane 9 in the secondary scanning direction, and θ5 is the diffraction angle from the rotary hologram disk 1.

As a result, it is clear that as far as the above-described holographic scanner is constructed so that the diffraction angle from the rotary hologram disk 1 is not affected by the variation of the wavelength and the distance h2 between the two holograms is made small, the deviation η3 of the image formation point on the scanning plane 9 in the secondary scanning direction can be largely reduced.

The above feature has been applied to the holographic scanner of this example shown in FIGS. 1 and 2 by setting a configuration described below. This effect of reducing the deviation η3 of the image formation point 15 on the scanning plane 9 has been confirmed by performing ray tracing.

The configuration is that the directions of the first diffracted beam 12 from the front hologram 2 and the second diffracted beam 13 from the rotary hologram disk 1 are set to be the reverse of each other. At the same time, a diffraction angle C of the rear hologram 3 is set so that the direction of the third diffracted beam 14 from the rear hologram 3 is on the same side as that of the first diffracted beam 12 when the diffraction angle A is smaller than the diffraction angle B, or as that of the second diffracted beam 13 when the diffraction angle B is smaller than the diffraction angle A.

Figure 5:
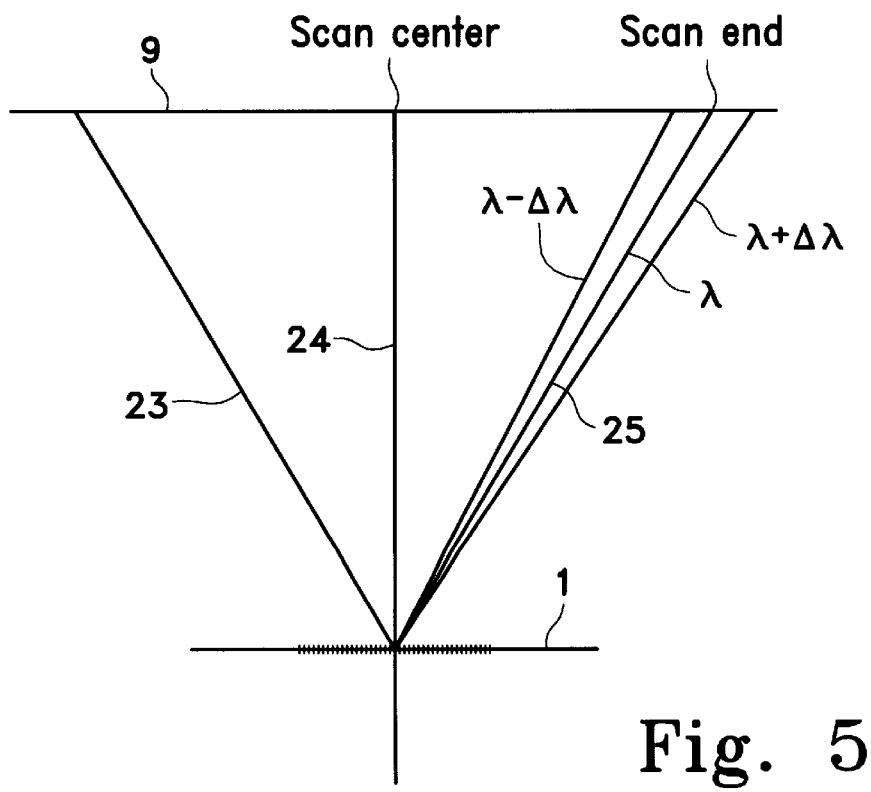
FIG. 5 shows an optical path of the principal ray on the sagittal plane when the wavelength varies for the holographic scanner including the rotary hologram disk with or without the front hologram.

FIG. 5 shows an optical path of the principal ray on the sagittal plane for a holographic scanner including the rotary hologram disk 1 with or without the front hologram 2.

As the rotary hologram disk 1 rotates, the sagittal plane component of a fringe on the rotary hologram disk 1 varies, and the principal ray moves from the scan left end 23 to the scan center 24 and then to the scan right end 25 sequentially.

When the wavelength λ of the light beam emitted from the light source is 780 nm, and the sagittal plane component of the fringe pitch is 1.56 μm, the diffraction angle E is 30.00° according to equation (2). When the wavelength λ changes by 1 nm to be 781 nm, the diffraction angle E changes to 30.04°. Assuming that the distance between the rotary hologram disk 1 and the scanning plane 9 is 400 mm, the deviation ξ1 of the image formation point 15 at the scan ends on the scanning plane 9 in the primary scanning direction is 0.40 mm as calculated in the equation:

$$\xi 1 = h3 (\tan\theta 6 - \tan\theta 7) \quad (6)$$

where ξ1 is the deviation on the scanning plane 9 in the primary scanning direction, h3 is the distance between the rotary hologram disk 1 and the scanning plane 9, θ6 is the sagittal plane component of the diffraction angle when the wavelength is 781 nm, and θ7 is the sagittal plane component of the diffraction angle when the wavelength is 780 nm.

As described above, the deviation ξ1 in the primary scanning direction is comparatively large for the holographic scanner including the rotary hologram disk 1 with or without the front hologram 2.

Figure 6:
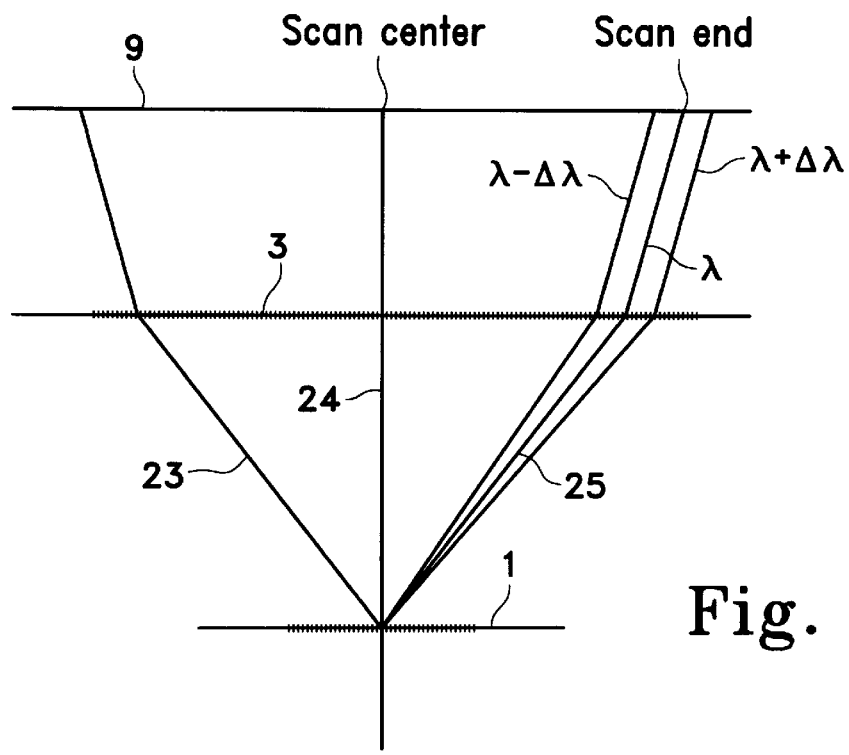
FIG. 6 shows an optical path of the principal ray on the sagittal plane when the wavelength varies for the holographic scanner including the rotary hologram disk and a rear hologram with or without the front hologram.

FIG. 6 shows an optical path of the principal ray on the sagittal place for a holographic scanner including the rotary hologram disk 1 and the rear hologram 3 with or without the front hologram 2.

In such a holographic scanner, when the directions of the second diffracted beam from the rotary hologram disk 1 and the third diffracted beam from the rear hologram 3 are made in reverse of each other on the sagittal plane, the deviation ξ2 of the image formation point in the primary scanning direction caused by the variation of the wavelength of the light beam emitted from the light source can be reduced as described below.

When the wavelength λ of the light beam emitted from the light source is 780 nm and the sagittal plane component of the fringe pitch is 1.56 μm, the diffraction angle E from the rotary hologram disk 1 is 30.00° according to equation (2). When the wavelength λ changes by 1 nm to be 781 nm, the diffraction angle E changes to 30.04°.

Since the rear hologram 3 is disposed between the rotary hologram disk 1 and the scanning plane 9, the distance h4 between the rotary hologram disk 1 and the rear hologram 3 can be smaller than the distance h3 between the rotary hologram disk 1 and the scanning plane 9. Accordingly, when the distance between the rotary hologram disk 1 and the rear hologram 3 is 200 mm, the deviation ξ2 at the scan end on the rear hologram 3 in the primary scanning direction is 0.20 mm as calculated in the equation:

$$\xi 2 = h4 \; (\tan\theta 8 - \tan\theta 9) \tag{7}$$

where ξ2 is the deviation on the rear hologram 3 in the primary scanning direction, h4 is the distance between the rotary hologram disk 1 and the rear hologram 3, θ8 is the sagittal plane component of the diffraction angle when the wavelength is 781 nm, and θ9 is the sagittal plane component of the diffraction angle when the wavelength is 780 nm.

Assuming that the sagittal plane component of the fringe pitch of the rear hologram 3 is 2.4 μm, when the wavelength λ 780 nm, the diffraction angle from the rear hologram 3 is 10.08° according to equation (2). When the wavelength λ changes by 1 nm to be 781 nm, the diffraction angle of the rear hologram 3 changes to 10.09°. Accordingly, the deviation ξ1 of the image formation point at the scan ends on the scanning surface 9 in the primary scanning direction is a little bigger than 0.20 mm as calculated by equation (7).

As described above, when the hologram scanner is configured so that the directions of the second diffracted beam from the rotary hologram disk 1 and the third diffracted beam from the rear hologram 3 are the reverse of each other on the sagittal plane, the deviation ξ1 of the image formation point on the scanning plane 9 in the primary scanning direction caused by the variation of the wavelength of the light beam emitted from the light source can be reduced, compared with the aforementioned hologram scanner without the rear hologram 3.

Figure 7:
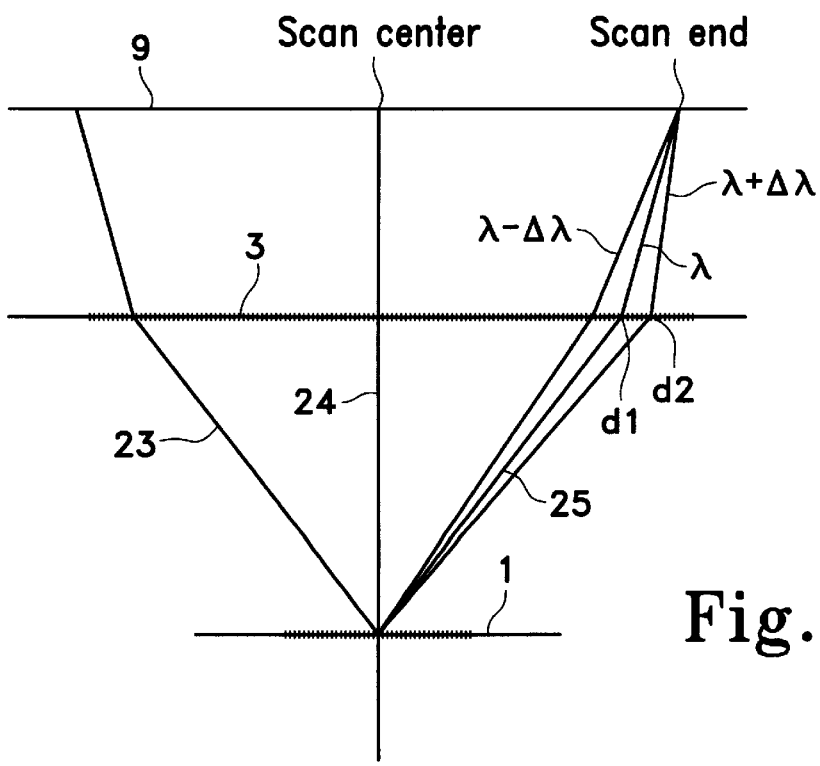
FIG. 7 shows an optical path of the principal ray on the sagittal plane when the wavelength varies for the holographic scanner according to the present invention.

FIG. 7 shows an optical path of the principal ray on the sagittal plane for a holographic scanner including the rotary hologram disk 1 and the rear hologram 3 with or without the front hologram 2.

In such a holographic scanner, when the directions of the second diffracted beam from the rotary hologram disk 1 and the third diffracted beam from the rear hologram 3 are made in reverse of each other on the sagittal plane, and the rear hologram 3 is provided with the converging power, the deviation of the image formation point on the scanning plane 9 in the primary scanning direction caused by the variation of the wavelength of the light beam emitted from the light source can be further reduced as described below.

Since the rear hologram 3 is provided with the converging power, at the scan right end 25 shown in FIG. 7, for example, the sagittal plane component of the fringe pitch d1 on the rear hologram 3 near the principal ray on the sagittal plane is larger than the sagittal plane component of the fringe pitch d2 near a ray on the right side of the principal ray.

Assuming that the configuration of FIG. 7 is the same as that of FIG. 6 except for the fringe pitch of the rear hologram 3 as stated above, when the wavelength λ of the light beam emitted from the light source is 780 nm, and the sagittal plane component of the fringe pitch d1 near the principal ray at this time is 2.4 μm, the diffraction angle of the rear hologram 3 is 10.08° according to equation. (2). When the wavelength λ changes by 1 nm to be 781 nm, and the sagittal plane component of the fringe pitch d2 near the principal ray at this time is 2.39 μm, the diffraction angle of the rear hologram 3 is 10.01°.

Accordingly, when the distance between the rear hologram 3 and the scanning plane 9 is 200 mm, the deviation ξ3 of the image formation point at the scan end on the scanning plane 9 in the primary scanning direction is 0.05 mm as calculated in the equation:

$$\xi 3 = \xi 2 - h5 \; (\tan\theta 10 - \tan\theta 11) \tag{8}$$

where ξ2 is the deviation on the rear hologram 3 in the primary scanning direction, ξ3 is the deviation on the scanning plane 9 in the primary scanning direction, h5 is the distance between the rear hologram disk 3 and the scanning plane 9, θ10 is the sagittal plane component of the diffraction angle of the rear hologram 3 when the wavelength is 780 nm, and θ11 is the sagittal plane component of the diffraction angle of the rear hologram 3 when the wavelength is 781 nm.

As described above, when the hologram scanner is configured so that the directions of the second diffracted beam from the rotary hologram disk 1 and the third diffracted beam from the rear hologram 3 are the reverse of each other on the sagittal plane, and the rear hologram 3 is provided with the converging power, the deviation ξ3 of the image formation point on the scanning plane 9 in the primary scanning direction caused by the variation of the wavelength of the light beam emitted from the light source can be further reduced, compared with the hologram scanner shown in FIG. 6.

As is apparent from the above description with reference to FIGS. 3 to 7, the holographic scanner according to the present invention shown in FIGS. 1 and 2 can minimize the deviation of the image formed on the scanning plane caused by the variation of the wavelength of the light beams. At the same time, it can improve the image formation properties of the scanning beams, minimize the bow of the scanning line, and effect the uniform-speed scanning.

Further, according to the holographic scanner of the present invention, the scanning holograms 6 of the rotary hologram disk 1, the front hologram 2 and the rear hologram 3 have different roles from each other so as to achieve a predetermined holographic function as a whole. Accordingly, these holograms can be designed simply as fringes formed by the two-beam interference of spherical waves or plane waves or concentric fringes without including complicated aberration waves. Such holograms were practically designed based on ray tracing and, as a result, a hologram scanner with high precision having a scanning bow of 0.4 mm and a deviation from the speed uniformity of within ±0.4 mm was obtained under the conditions of a total optical path length of 350 mm, a scanning span of 210 mm, a resolution of 600 DPI, and a variation of the wavelength of light beams from a light source of ±5 nm. Further, the deviation of a spot position caused by a momentary wavelength variation (approximately 0.3 nm) at mode hopping, for example, was as small as 10 μm both in the primary and secondary scanning directions.

The above-mentioned deviation from the speed uniformity is represented by the equation:

$$Xerr = X - Xref \tag{9}$$

where Xerr is the deviation from the speed uniformity, X is the scanning position, and Xref is the scanning position at which the speed uniformity can be completely satisfied.

In this example, the light beams incident to the front hologram 2 are parallel light. However, they can be converged light, diverged light, or aberration waves so that the total aberration can be removed.

High diffraction efficiency is required for practical applications of the hologram scanner according the present invention. Accordingly, the hologram must be designed so that high diffraction efficiency can be obtained.

One of the most practical methods for obtaining high diffraction efficiency is to design the optical system for the hologram to be as close to the Bragg condition as possible and not to allow light beams other than zero-order diffracted beams and first-order diffracted beams to output from the hologram. That is, in equation (1), conditions should be set to obtain $\alpha = \beta$ and $\lambda/d > 0.75$.

As is shown in FIG. 2, the holographic scanner of this example satisfies the above conditions. All of the rotary hologram disk 1, the front hologram 2, and the rear hologram 3 substantially satisfy the Bragg condition. Further, the difference between the diffraction angle A and the diffraction angle B is comparatively large, and the diffraction angle C is also large. The holographic scanner with the above-described configuration was practically designed by ray tracing. As a result, the diffraction angles A, B, and C were 47.3°, 29.5°, and 24.0°, respectively. The wavelength of the light beams emitted from the light source was 780 nm. When the wavelength changed by 1 nm, the deviation of the image formation point in the secondary scanning direction was 38 $\mu$m.

Another method for obtaining high diffraction efficiency of the hologram is blazing. When blazing is employed, it is not necessary to satisfy the Bragg condition to obtain high diffraction efficiency. When the Bragg condition is satisfied, the diffraction angle and the spatial frequency of the hologram are proportional to each other. However, they are not proportional when blazing is employed. Accordingly, the condition for minimizing the deviation of the image formation point in the secondary scanning direction when blazing is employed should be defined as that the diffraction direction from the rear hologram 3 should be on the same side as that from the rotary hologram disk 1 when the spatial frequency thereof is smaller than that of the front hologram 2 or that from the front hologram 2 when the spatial frequency thereof is smaller than that of the rotary hologram disk 1.

Figure 8:
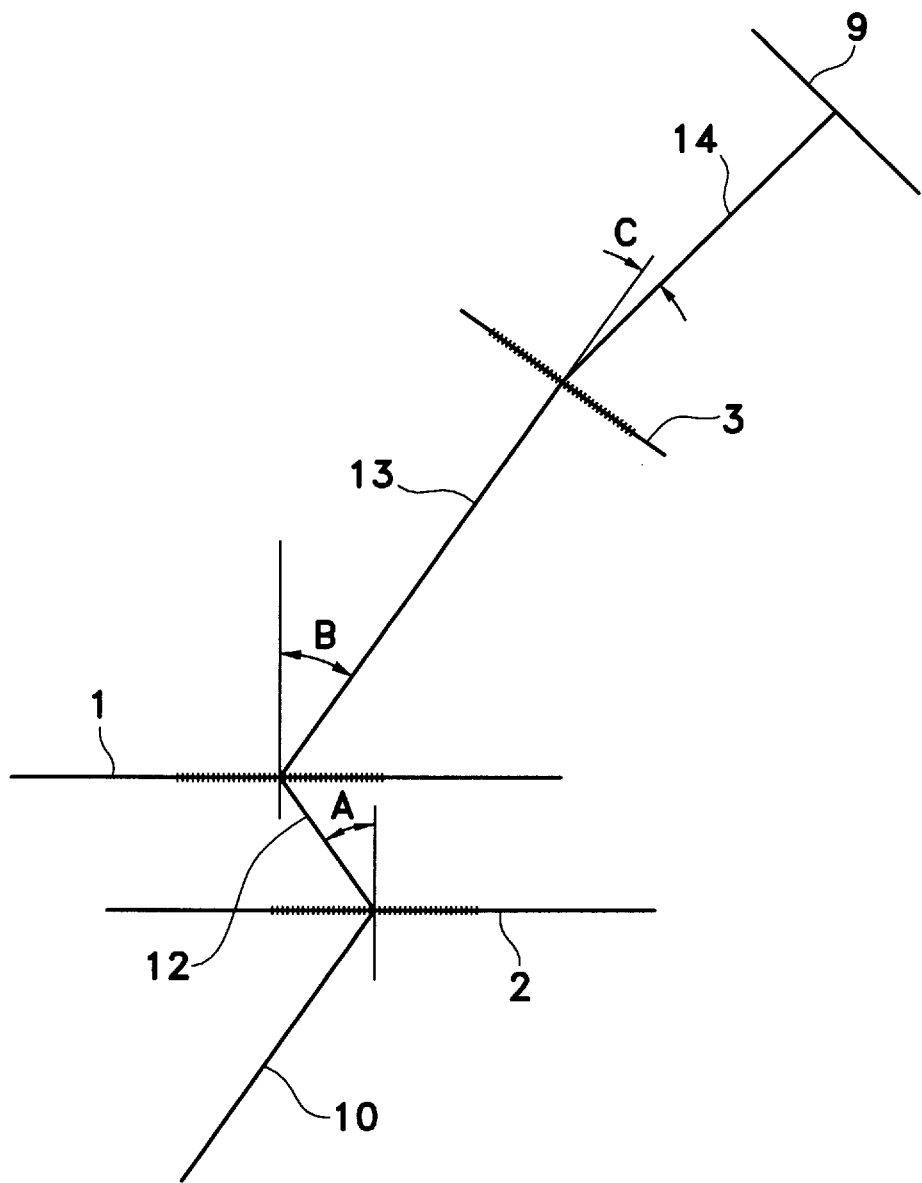
FIG. 8 is a view similar to FIG. 2, showing a modification of the holographic scanner of FIG. 1 according to the present invention.

When the spatial frequency of the rear hologram 3 is very small and thus the diffraction angle C thereof is small, as is shown in FIG. 8, the above condition for minimizing the deviation of the image forming point in the secondary scanning direction may not be satisfied.

In the above case, however, it is possible to minimize the deviation of the image formation point in the primary scanning direction. This can be realized by setting the direction of the diffracted beam 13 to be the reverse of that of the diffracted beam 14 on the sagittal plane, regardless of the configuration on the meridional plane, and by providing the rear hologram 3 with the converging power. These configurations are also included in the present invention.

Thus, according to the holographic scanner of this example, since at least three holograms are used for optical scanning, it is possible to satisfy all the requirements of improving the image formation properties of the scanning beams, minimizing the bow of the scanning line, and effecting the uniform-speed scanning at the same time even when the wavelength of the light beams varies. As a result, the quality of the scanning beams improves and thus the reliability thereof increases.

Further, since the above requirements can be satisfied without the necessity of an expensive lens for image formation such as a fθ lens, the size of the scanner can be small and the cost thereof reduced.

Moreover, when at least three holograms are disposed as described above, these holograms have different roles from each other in order to achieve the holographic function as a whole. Accordingly, these holograms can be designed simply as fringes formed by the two-beam interference of spherical waves or plane waves or concentric fringes without the necessity of complicated aberration waves. Accordingly, the holograms can be easily produced, and the cost thereof reduced. Further improvement may be expected if aberration waves are utilized.

According to the holographic scanner of this example, at the scan center on the meridional plane, the directions of the first diffracted beam from the front hologram and the second diffracted beam from the rotary hologram disk are set to be reverse of each other. At the same time, the diffraction direction from the rear hologram is set to be on the same side as the direction from the rotary hologram disk when the spatial frequency thereof is smaller than that of the front hologram or the direction from the front hologram when the spatial frequency thereof is smaller than that of the rotary hologram disk. With this configuration, the deviation of the image formation point in the secondary scanning direction caused by the variation of the wavelength of the light beams can be minimized.

Further, the hologram is formed so that the direction of the diffracted beam from the rotary hologram disk and that of the diffracted beam from the rear hologram are set to be the reverse of each other on the sagittal plane. With this configuration, the optical path length can be shortened, and the deviation of the image formation point in the primary scanning direction caused by the variation of the wavelength can be minimized.

Moreover, the deviation of the image forming point in the primary scanning direction caused by the variation of the wavelength can be further reduced by providing the rear hologram with the converging power.

EXAMPLE 2

A second example of the holographic scanner according to the present invention will be described.

Figure 18:
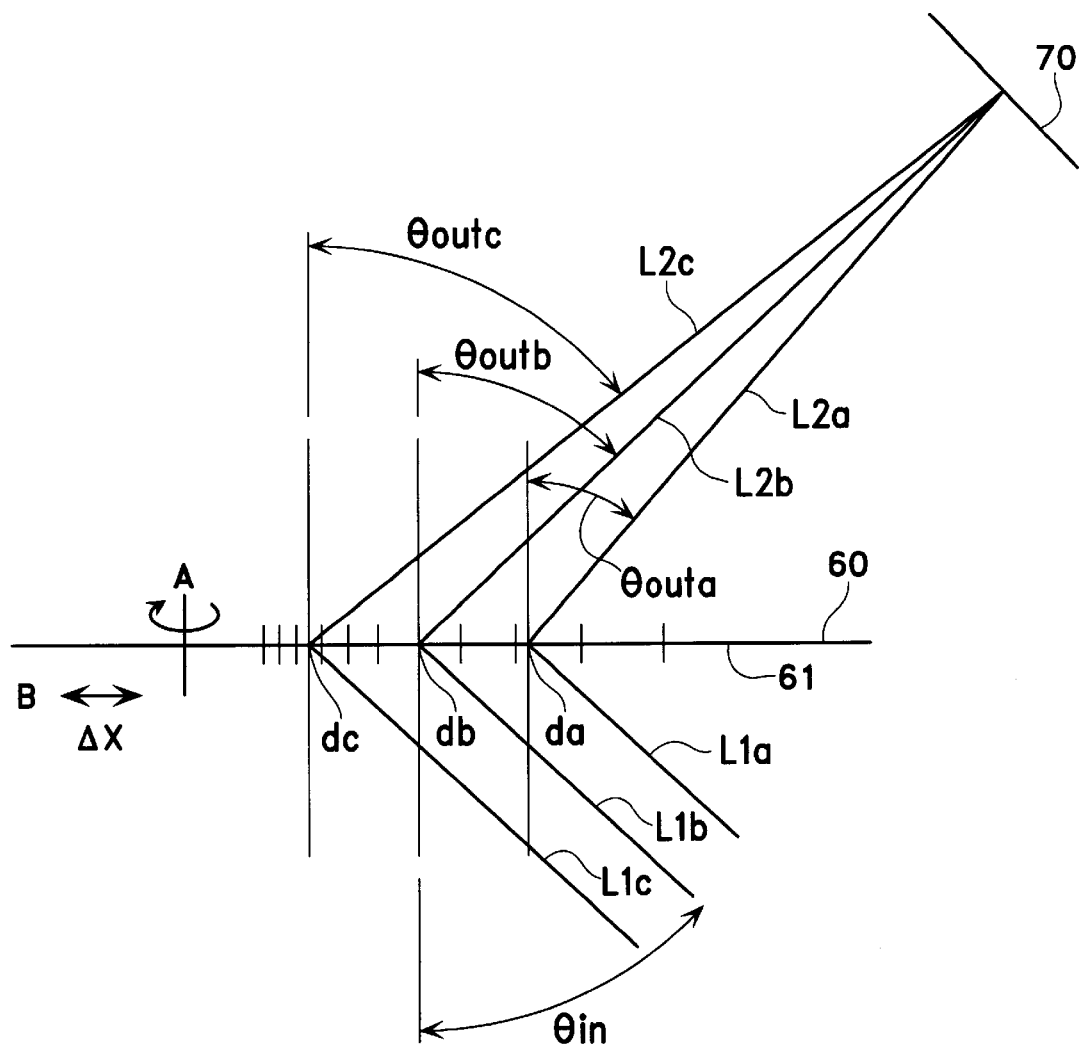
FIG. 18 is a view to show a problem in conventional holographic scanners when a hologram disk is decentered.
Figure 19:
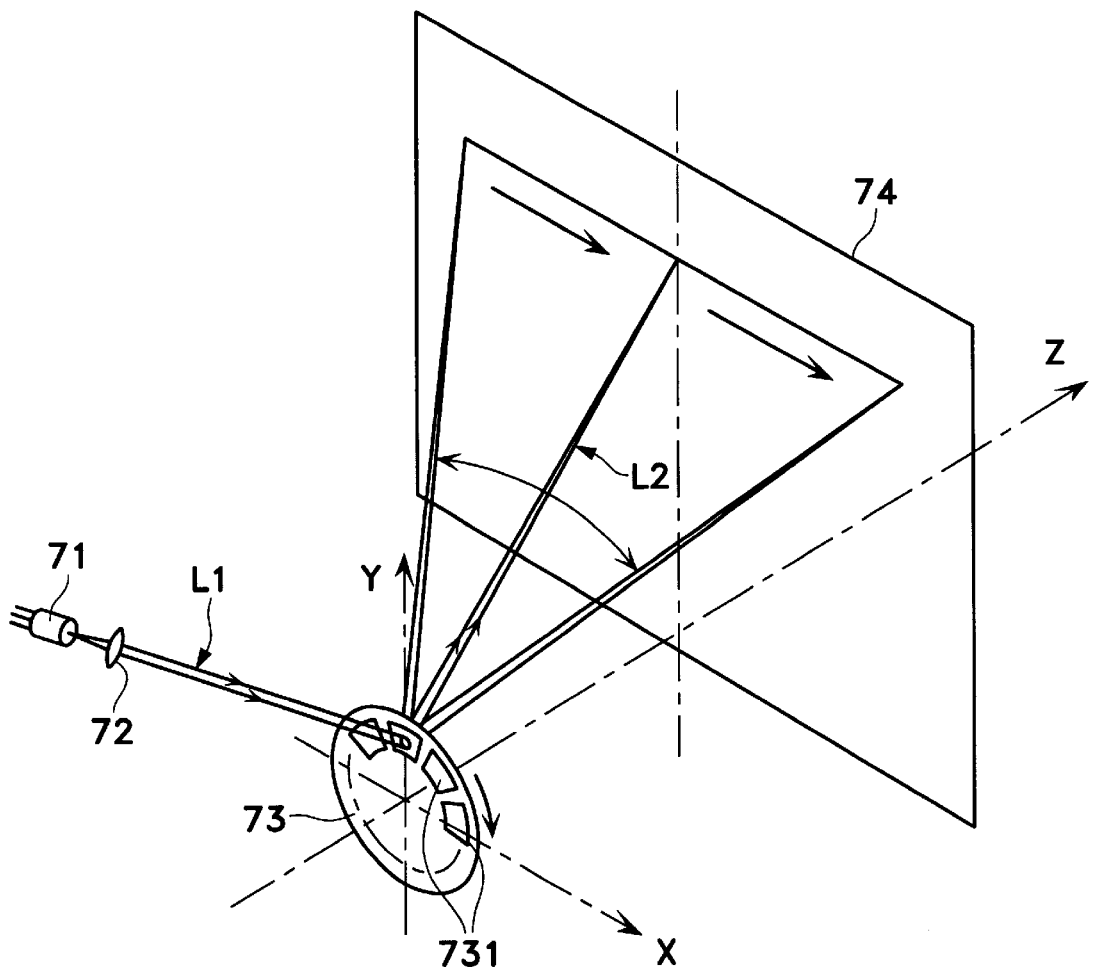
FIG. 19 is a schematic view of a conventional holographic scanner.

The basic configuration of the holographic scanner of this example is the same as that of Example 1 shown in FIG. 1. The most significant feature of the holographic scanner of this example is that the pitch of the interference fringes recorded on the scanning holograms 6 is substantially uniform in the radial direction (i.e., da=db=dc in FIG. 18), thus decreasing the converging power of the scanning holograms 6 (mainly on the meridional plane). As a result, the first diffracted beam 12 which is substantially parallel is diffracted from the scanning hologram 6 as the second diffracted beam 13 which is also substantially parallel.

The second diffracted beam 13 diffracted from the scanning hologram 6 is guided so as to reach the scanning plane 9 of a photosensitive drum, for example, through the mirror 8 and the rear hologram 3.

The rear hologram 3 disposed between the rotary hologram disk 1 and the scanning plane 9 is immobilized unlike the rotary hologram disk 1, and is designed to have a converging power. The second diffracted beam 13 is diffracted from the rear hologram 3 as the third diffracted beam 14 and is converged onto the image formation point 15 on the scanning plane 9.

As described earlier, as the rotary hologram disk 1 is rotated by the motor 7, the diffraction angle of the second diffracted beam 13 from the rotary hologram disk 1 varies. Thus, the third diffracted beam 14 moves in the direction shown in the arrow in FIG. 1 so as to effect the primary scanning. Also, the scanning plane 9 moves in the direction vertical to the scanning direction in order to effect the secondary scanning.

The front hologram 2, the scanning hologram 6 on the rotary hologram disk 1, and the rear hologram 3 have different roles from each other in order to achieve a predetermined holographic function as a whole. Accordingly, the patterns of the interference fringes recorded on these holograms can be determined by optimization based on ray tracing by a computer.

Now, a typical design of a holographic scanner in which the converging power of the scanning hologram is not restricted will be described. The pitches of the respective holograms are set as follows:

front hologram: 0.616 µm
scanning hologram: 0.614 µm
rear hologram: 3.93–2.24 µm In the above case, the focal distance of the scanning hologram 6 is 120 mm. When the rotary hologram disk 1 is decentered or shifted by 100 µm, the deviation of the image formation point at the scan center on the scanning plane is ±147 µm in the secondary scanning direction.

When the holographic scanner is applied to a laser beam printer, dots are printed by turning on and off of the semiconductor laser of the holographic scanner. When a holographic scanner having a resolution of 300 dpi is used, the pitch of the adjacent dots is 25.4/300≈87.4 µm. In this case, the allowable error of the dot pitch caused by the decentering or shifting is 20 µm or less. The above case does not satisfy this requirement.

The above problem can be solved by restricting the converging power of the scanning hologram. In the holographic scanner of this example, the pitches of the interference fringes of the respective holograms are set as follows:

front hologram 2: 0.603 µm
scanning hologram 6: 0.535 µm
rear hologram 3: 7.18–2.52 µm The converging power of the rear hologram 3 has been set larger in order to compensate the reduction of the converging power of the scanning hologram 6 according to the optimization. In this case, the focal distance of the scanning hologram 6 is 643 mm. According to the design of this example, even when the rotary hologram disk 1 is decentered or shifted by ±100 µm, the deviation of the image formation point 15 on the scanning plane 9 is as small as ±12 µm at the scan enter. Moreover, it has been confirmed that the deviation can be reduced to ±1 µm by further optimization. With such a small amount of deviation, no trouble will occur when the holographic scanner of this example is applied to a laser beam printer.

Figure 9:
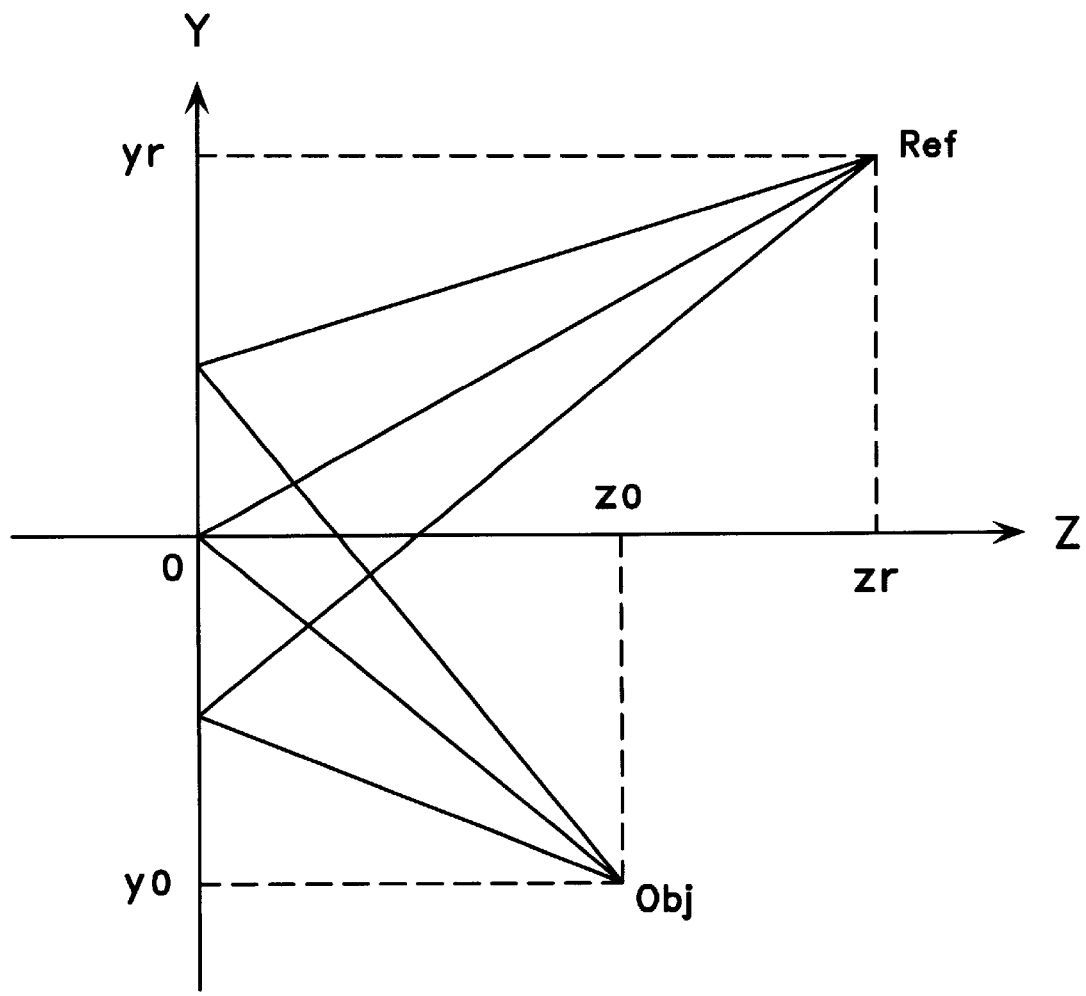
FIG. 9 shows the relationship between two beams used for the formation of a scanning hologram by two-beam interference for a second example of the holographic scanner according to the present invention.

FIG. 9 is an X-Y-Z coordinate showing the relationship between two beams used for the formation of the scanning hologram 6 of the rotary hologram disk 1 by the two-beam interference. The X-axis (not shown) represents the primary scanning direction, the Y-axis represents the secondary scanning direction, and the Z-axis represents a direction vertical to the rotary hologram disk 1.

The coordinate of the source of a reference beam Ref is (0, yr, zr) and that of an object beam Obj is (0, yo, zo). A pattern of interference fringes is formed on the scanning hologram 6 of the rotary hologram disk 1 by the interference of these beams. At this time, the paraxial focal distance f at the center O of the rotary hologram disk 1 is represented by the equation:

$$1/f = (\lambda 1/\lambda 2)[(yo^2+zo^2)^{-\frac{1}{2}} - (yr^2+zr^2)^{-\frac{1}{2}}] \qquad (10)$$

where $\lambda 1$ is the wavelength of the recording wave and $\lambda 2$ is the wavelength of the reconstructed wave.

The configuration of the holographic scanner of this example is not limited to the one described above. The front hologram 2 can be omitted, for example, so as to obtain a similar holographic function.

Thus, according to the holographic scanner of this example, the deviation of the image formation point can be minimized even when the hologram disk is decentered or shifted. This makes it possible to apply the holographic scanner to high-precision apparatuses such as a laser beam printer. Further, since an optical lens such as a cylindrical lens is not necessary, a light-weight and inexpensive holographic scanner can be realized. Moreover, since the allowance of the decentering or shifting of the rotary hologram disk is comparatively large, mass production of the holographic scanner is possible.

EXAMPLE 3

A third example of the holographic scanner according to the present invention will be described. The basic configuration of the holographic scanner of this example is the same as that of Example 1 shown in FIG. 1.

The rear hologram 3 is a plate elongated along the scanning direction and immobilized at a position between the rotary hologram disk 1 and the scanning plane 9 for performing aberration correction and fθ correction. That is, the rear hologram 3 corrects aberration of the diffracted beams on the scanning plane 9 over the span of the scanning, in cooperation with the front hologram 2. The rear hologram 3 also effects scanning at a uniform speed proportional to the rotation of the rotary hologram disk 1 and ensures the linear scanning.

Generally, when a small-size holographic scanner is desired, it is required as a design feature to shorten the optical path length between the hologram disk and the scanning plane. To shorten the optical path length, the pitch of the diffraction grating of the rear hologram must be large. When the pitch is 2 µm or more, especially when the rear hologram is of a "deep-groove" type, the diffraction efficiency of the rear hologram greatly decreases. When the diffraction efficiency is low, a high-output semiconductor laser is required for the light source. It is therefore difficult to obtain a small-size holographic scanner at low cost.

Figure 10:
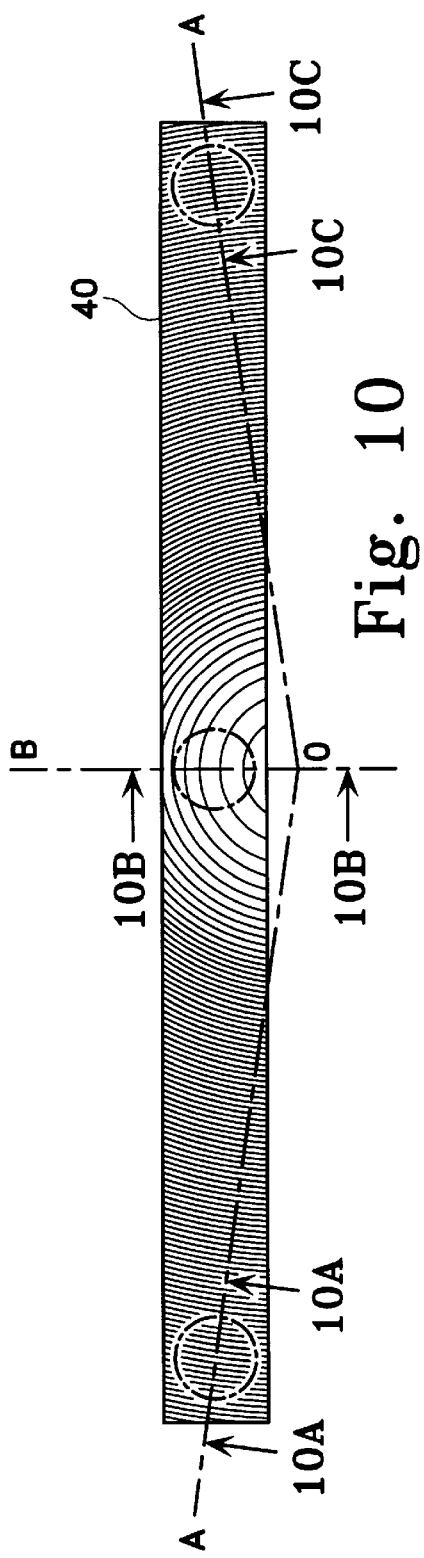
FIG. 10 is a top view of a rear hologram together with enlarged partial sections thereof for a third example of the holographic scanner according to the present invention.
Figure 10:
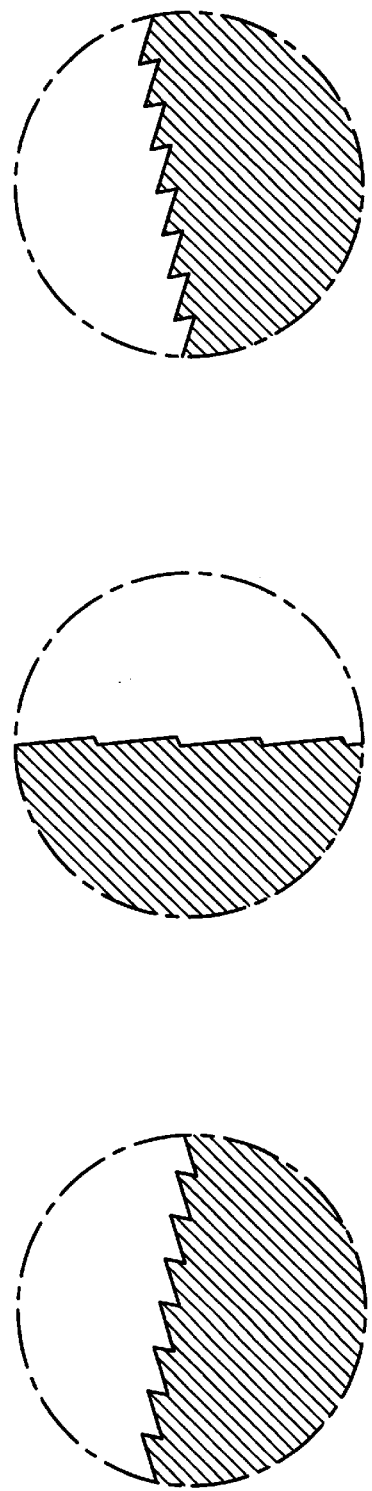

To solve this problem, according to the holographic scanner of this example, the diffraction grating formed on the rear hologram 3 includes concentric "blazed" fringes. FIG. 10 shows the shape of the fringes formed on the rear hologram 3 of this example. The line O-B passes along the scan center. As is shown in FIG. 10, the blazed fringes form concentric circles having a virtual center O, and the pitches between the adjacent circles are set smaller when the circles are located farther from the center O.

The rear hologram 3 is manufactured by first producing a mold with a pattern of the diffraction grating by cutting the pattern by means of a high-precision slice. Since the pattern of the diffraction grating for the rear hologram 3 of this example is concentric, the cutting process is comparatively easy.

The front hologram 2, the scanning hologram 6 on the rotary hologram disk 1, and the rear hologram 3 have different roles from each other in order to achieve a predetermined holographic function as a whole. Accordingly, the patterns of the diffraction gratings formed on these holograms can be determined by optimization based on ray tracing by use of a computer.

The optical path length of the holographic scanner of this example is set to 250 mm. As a result of the optimization, the pitches of the diffraction gratings of the respective holograms are as follows:

front hologram 2: 0.534 μm
scanning hologram 6: 0.534 μm
rear hologram 3: 18.7–2.6 μm As for the rear hologram 3, 18.7 μm is a pitch on the portion shown as the O-B section in FIG. 10, and 2.6 μm is a pitch on the portions shown as the O-A section.

At this time, the spot diameter ($1/e^2$) on the scanning plane 9 is 60 μm. Accordingly, when the wavelength of the light beams emitted from the semiconductor laser 16 varies by 0.1 nm, the deviation of the image formation point on the scanning plane 9 in the primary scanning direction is as small as 7.8 μm. It can be seen from this result that the holographic scanner of this example provides an excellent optical property.

For reference, the pitches of the respective holograms when a conventional rear hologram of the deep-groove type is used are shown as follows:

front hologram: 0.477 μm
scanning hologram: 0.807 μm
rear hologram: 0.945–0.908 μm In this case, the spot diameter ($1/e^2$) on the scanning plane is 60 μm. However, when the wavelength of the light beams emitted from the semiconductor laser varies by 0.1 nm, the deviation of the image formation point on the scanning plane in the primary scanning direction is approximately 11 μm. Also, the optical path length is 376 mm. As a result, the optical property of this conventional holographic scanner is inferior compared with that of the holographic scanner of this example.

From the above results, it can be seen that, when the pitch of the diffraction grating of the rear hologram 3 is set to 2 μm or more, not only the diffraction efficiency but also other optical properties of the holographic scanner can be improved compared with the case of using the conventional deep-groove type hologram.

The holographic scanner of this example is not restricted to the type exemplified above, but can be of any type in so far as it includes three holograms (a front hologram, a scanning hologram, and a rear hologram).

Thus, according the holographic scanner of this example, since the rear hologram has the blazed fringes, the pitch of the rear hologram can be 2 μm or more without reducing the diffraction efficiency thereof. As a result, it is possible to obtain a small-size holographic scanner at low cost. Further, because of the concentric pattern of the diffraction grating, the rear hologram can be easily manufactured, whereby mass production and thus cost reduction of the holographic scanner are possible.

EXAMPLE 4

A fourth example of the holographic scanner according to the present invention will be described. The basic configuration of the holographic scanner of this example is the same as that of Example 1 shown in FIG. 1.

Figure 11:
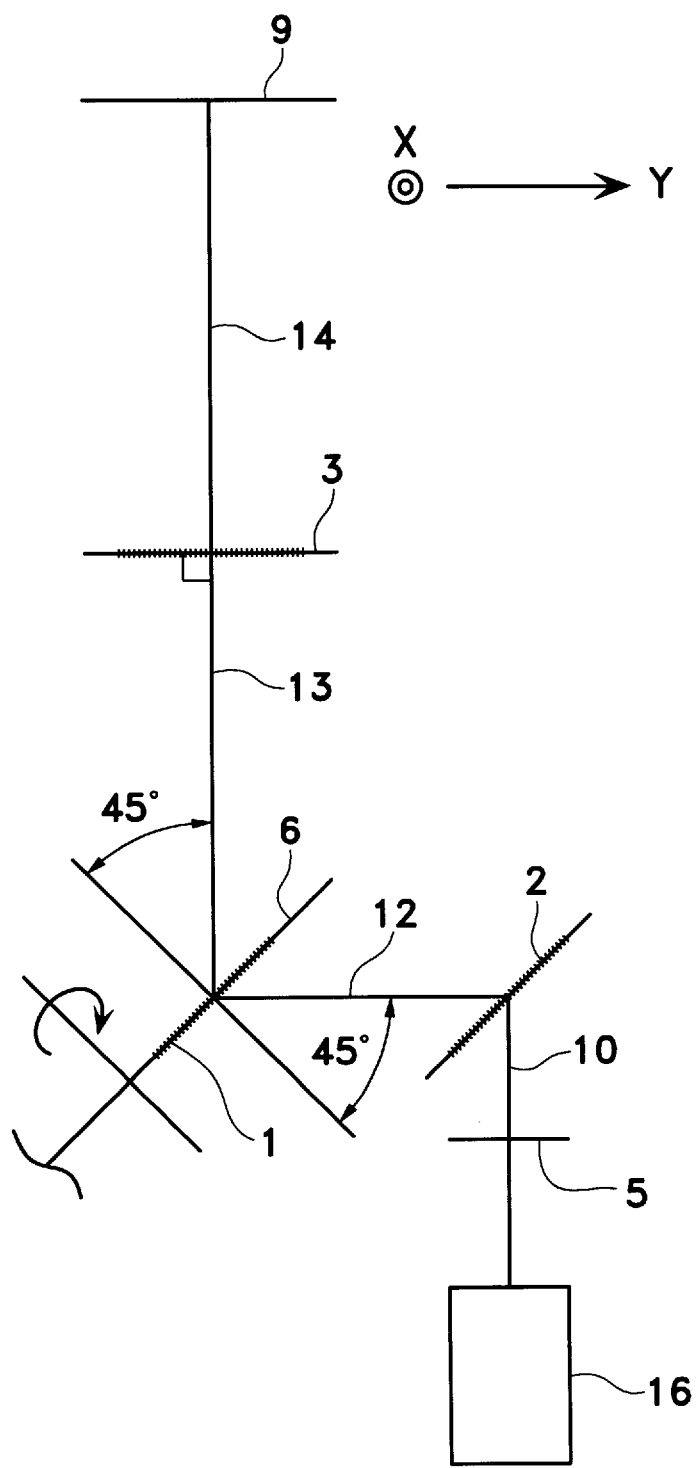
FIG. 11 is a schematic view of a holographic scanner showing an optical path on the meridional plane.

FIG. 11 shows a schematic configuration of a holographic scanner, together with an optical path on the meridional plane. The optical path of FIG. 11 shows a state where the second diffracted beam 13 is introduced to the scan center of the rear hologram 3. The incident angle of the first diffracted beam 12 to the scanning hologram 6 is set to 45°, and that of the second diffracted beam 13 to the rear hologram 3 is set to 0°.

The spot shape of the light beam emitted from the semiconductor laser 16 is elliptical elongated in the Y direction (though the optical axis of the light beam is bent by the intervening optical system including scanning hologram 6, the relation of the X direction and the Y direction with respect to the optical axis does not change). The elliptic shape of the light beam is corrected to a complete round through the collimator lens 5 and the front hologram 2 before the light beam is introduced to the scanner hologram 6, as is shown by the dash line in FIG. 12.

Figure 13:
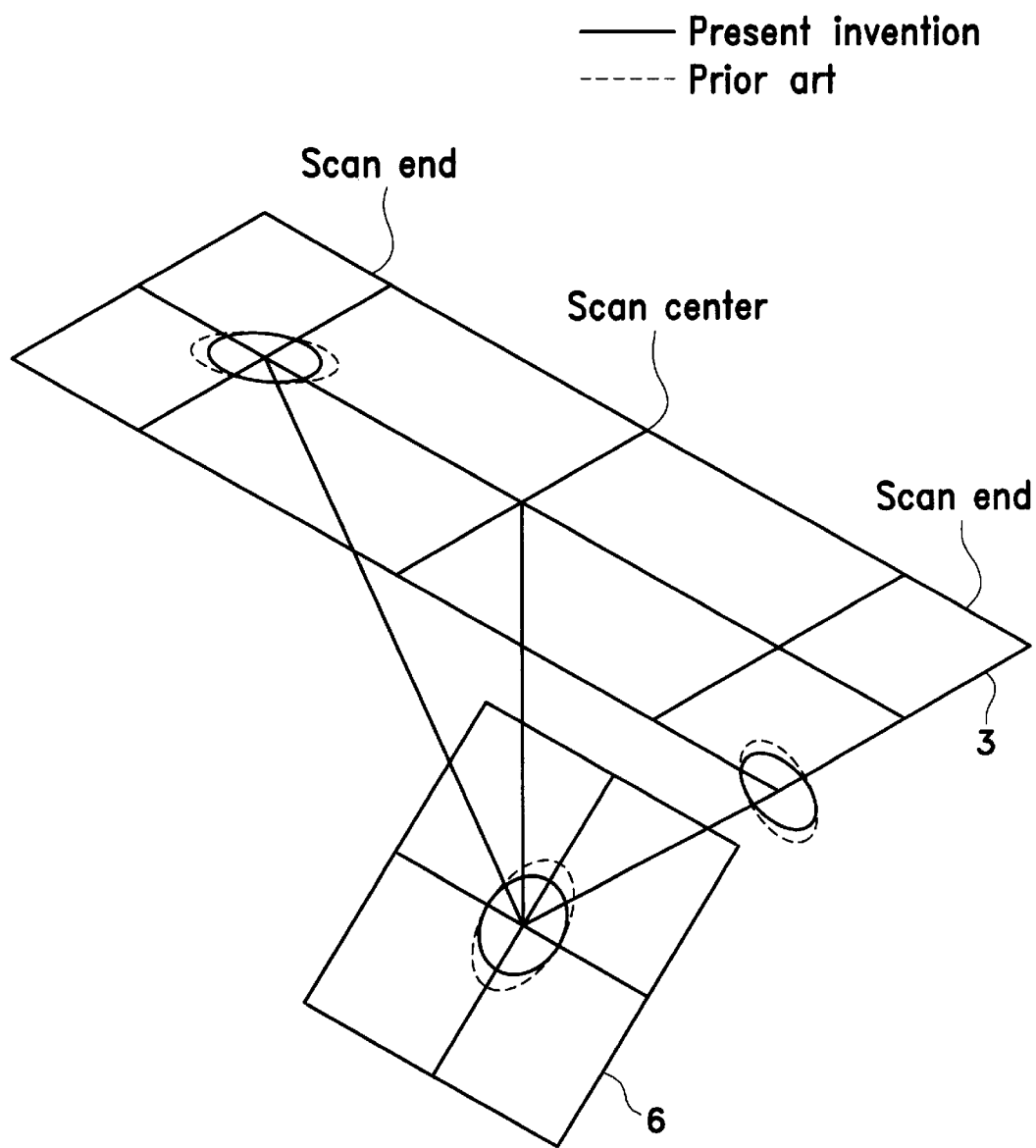
FIG. 13 is a schematic view of the scanning hologram and a rear hologram with beam spots thereon for the fourth example of the holographic scanner.

Since the incident angle of the first diffracted beam 12 to the scanning hologram 6 is 45°, the shape of the beam spot on the scanning hologram 6 is changed into an elliptic shape having a ratio of 1:√2 as is shown by the dash line in FIG. 13. Since the diffraction angle of the second diffracted beam 13 from the scanning hologram 6 is also 45° when the second diffracted beam 13 is introduced to the scan center of the rear hologram 3, the shape of the beam spot on the rear hologram 3 is again the complete round as is shown by the dash line in FIG. 14.

However, as the second diffracted beam 13 is introduced to a position closer to either of the scan ends and farther from the scan center on the rear hologram 3, the diffraction angle of the second diffracted beam 13 from the scanning hologram 6 is further deviated from 45°. As a result, the shape of the beam spot on the rear hologram 3 is further deviated from the complete round as is shown by dash lines in FIGS. 13 and 14. Thus, the spot shapes of the second diffracted beams 13 incident to the scan center and the scan ends of the rear hologram 3 greatly differs from each other. When an optical system which can sufficiently correct aberration is used, beams can be narrowed to the beam waist. In such a case, the variation of the spot shapes on the rear hologram 3 appears as the variation of the spot shapes on the scanning plane 9. When the hologram scanner is applied to a laser beam printer, this variation on the scanning plane 9, which is a photosensitive drum in this case, causes a difference of the spot shapes on the center portion and the end portions of a printing sheet. Thus, the printed letters are distorted, and the quality thereof is lowered.

To solve this problem, according to the holographic scanner of this example, the spot shape of the light beam emitted from the semiconductor laser 16 is made elliptically elongated in the X direction (the primary scanning direction) before it is introduced to the scanning hologram 6. Then, when being introduced to the scanning hologram 6 at a predetermined incident angle, the spot shape of the beam on the scanning hologram 6 is changed to be completely round.

The semiconductor laser 16 of this example has an outlet opening having an elliptic shape elongated in the X direction so as to emit light beams having an elliptical spot shape. In other words, the shape of the outlet opening of the semiconductor laser 16 is selected so that the spot shape of the first diffracted beam 12 on the scanning hologram 6 can be completely round.

Alternatively, an optical element such as a prism or a halfwave plate may be disposed between the semiconductor laser 16 and the front hologram 2 so as to change the spot shape of the light beam to an ellipse elongated in the X direction. Otherwise, the front hologram 2 may be provided with a function of shaping the light beam as described above.

Next, the operation of the holographic scanner of this example will be described. To clarify the difference from the aforementioned conventional holographic scanner, it is assumed that the incident angle of the first diffracted beam 12 to the scanning hologram 6 is 45° and that the second diffracted beam 13 is diffracted from the scanning hologram 6 at the diffraction angle of 45° when it is introduced to the scan center of the rear hologram 3.

Figure 12:
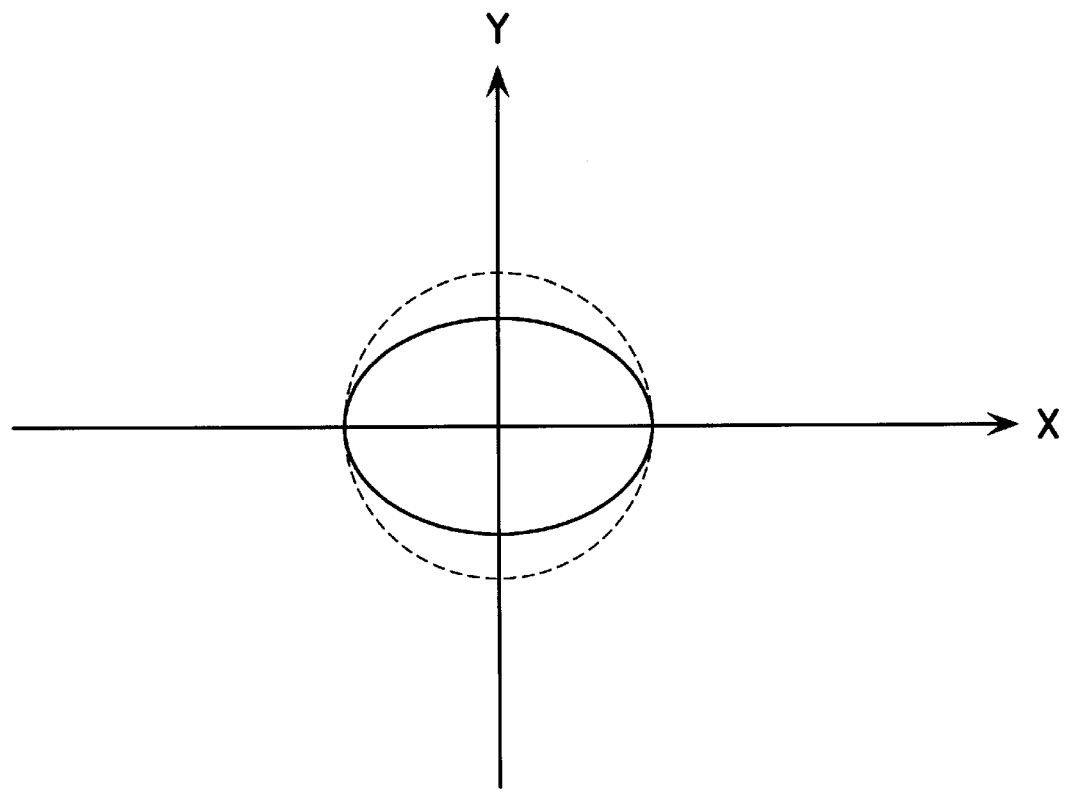
FIG. 12 is a spot shape of a light beam before being introduced to a scanning hologram for a fourth example of the holographic scanner according to the present invention.

The light beam emitted from the semiconductor laser 16 having the outlet opening as described above has an elliptic spot shape elongated in the X direction with a ratio of √2:1 as is shown in FIG. 12. The light beam having the elliptic spot shape is changed to be completely round as is shown in FIG. 13, after being introduced to the scanning hologram 6 at the incident angle of 45°.

Figure 14:
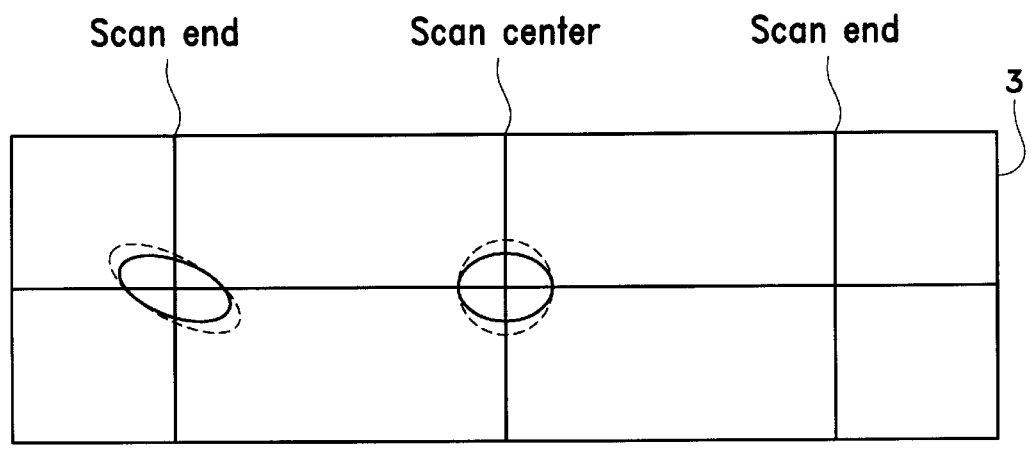
FIG. 14 shows beam spots on the rear hologram for the fourth example of the holographic scanner.

Unlike the conventional holographic scanner, because the spot shape of the light beam on the scanning hologram 6 is completely round, the spot shape of the second diffracted beam 13 introduced to the scan center on the rear hologram 3 is changed to an ellipse as is shown in FIG. 14. The spot shape of the second diffracted beam 13 at the scan ends on the rear hologram 3 is also an ellipse, as in the conventional holographic scanner.

In this example, however, the elliptic shape of the beam formed at the scan ends on the rear hologram 3 is more round as is shown in FIGS. 13 and 14 than in the conventional holographic scanner. This is because the light beam incident to the scanning hologram 6 has an elliptic spot shape elongated in the X direction (the primary scanning direction) as is shown in FIG. 12.

As a result, the difference of the spot shapes of the beams at the scan center and the scan ends on the rear hologram 3 is made less significant compared with the conventional case. Accordingly, even when an optical system which can sufficiently correct aberration is used and the light beams are narrowed to the beam waist, the difference of the spot shapes of the beams at the scan center and the scan ends on the scanning plane 9 is not so significant. As a result, when the hologram scanner is applied to a laser beam printer, there is no significant variation in the dots printed on the center portions and the end portions of a printing sheet. Thus, the quality of the printed letters increases.

The technique described in this example can also be applicable to a holographic scanner without a front hologram and/or a rear hologram.

EXAMPLE 5

A fifth example of the holographic scanner according to the present invention will be described.

Figure 15:
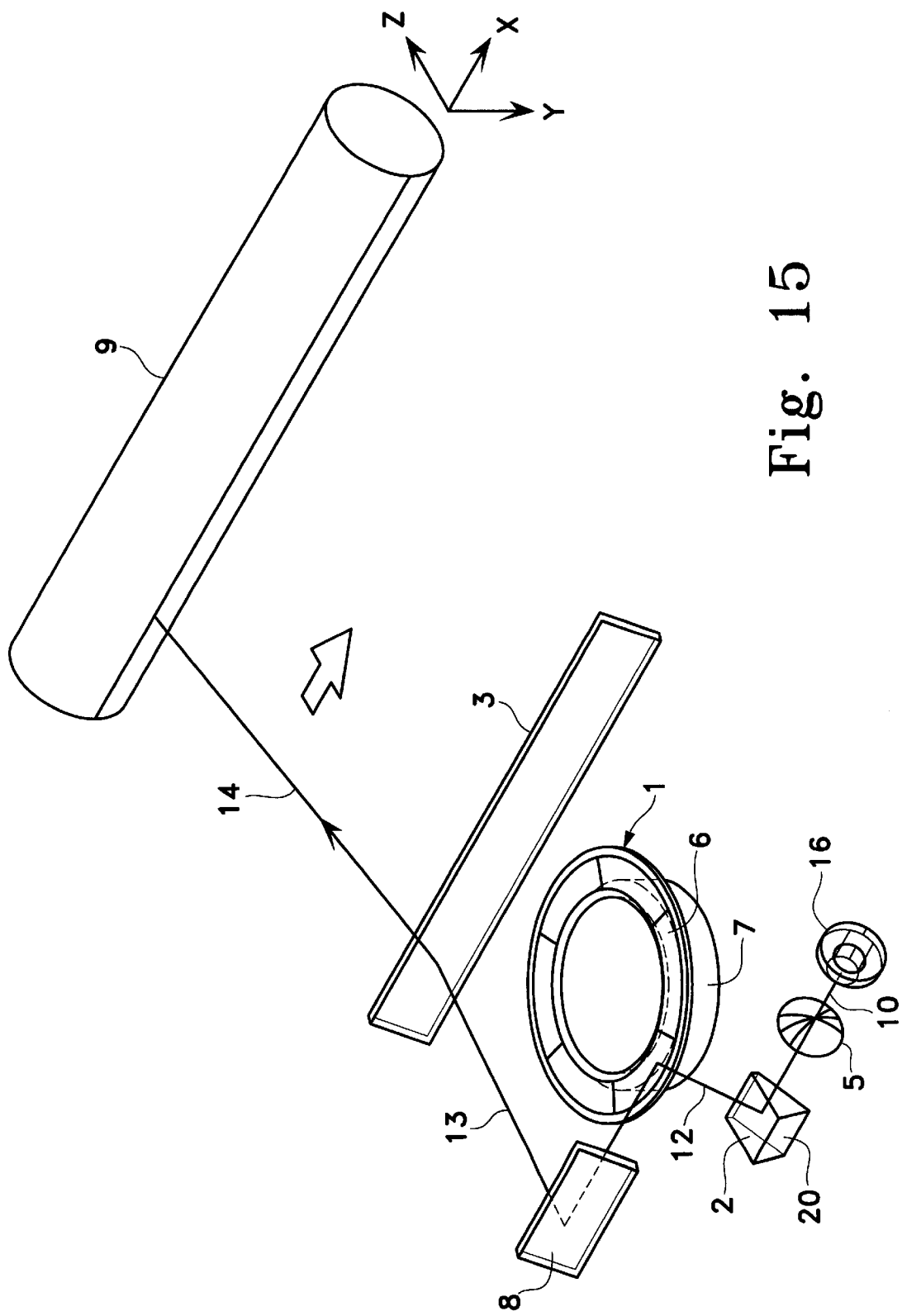
FIG. 15 is a structural perspective view of a fifth example of a holographic scanner according to the present invention.

The holographic scanner of this example is shown in FIG. 15 as being mounted in a laser beam printer. In this figure, like components are denoted as like reference numerals as in FIG. 1. Referring to FIG. 15, the light beam 10 emitted from the semiconductor laser 16 passes through the collimator lens 5, a triangular prism 20, and the front hologram 2 to be introduced to the scanning hologram 6 on the rotary hologram disk 1.

The triangular prism 20 which is disposed between the semiconductor laser 16 and the scanning hologram 6 has the function of changing the shape of the light beam 10 to an ellipse from a complete round. Since the triangular prism 20 is not required to be sensitive to the variation of the wavelength, an inexpensive material can be used for the triangular prism 20. In this example, the front hologram 2 is attached to one of the total six sides of the triangular prism 20 (see FIG. 16).

The front hologram 2 has the function of minimizing the deviation of the spot position on the scanning plane 9 caused by the variation of the wavelength of the light beam 10 emitted from the semiconductor laser 16, in cooperation with the scanning hologram 6 and the rear hologram 3, as in the above examples.

The total six scanning holograms 6 are arranged on the rotary hologram disk 1 in a circumferential direction. The rotary hologram disk 1 is rotated by the motor 7 disposed on the bottom thereof. The first diffracted beam 12 introduced to one of the scanning holograms 6 is diffracted therefrom as the second diffracted beam 13. As the rotary hologram disk 1 rotates, the diffraction angle of the second diffracted light beam 13 varies. The second diffracted light beam 13 from the scanning hologram 6 is guided by the mirror 8 and the rear hologram 3 to be converged on the scanning plane 9 which is a photosensitive drum in this case.

The rear hologram 3 which is disposed between the rotary hologram disk 1 and the scanning plane 9 has the function of correcting the aberration of the diffracted beam on the scanning plane 9 in cooperation with the front hologram 2 and the scanning hologram 6, and a function of fθ correction, i.e., securing scanning at a uniform speed proportional to the rotation of the rotary hologram disk 1.

As the diffraction angle of the third diffracted beam 14 varies depending on the rotation of the rotary hologram disk 1, the third diffracted beam 14 moves in the direction shown by the arrow in FIG. 15 (the X direction) so as to effect the primary scanning. At the same time, the scanning plane 9 moves in the Y direction as the photosensitive drum rotates so as to effect the secondary scanning. These constitute a basic operation of the holographic scanner. The Z direction in FIG. 15 is the direction vertical to the scanning plane 9.

The triangular prism 20, the front hologram 2, the scanning hologram 6, and the rear hologram 3 have different roles from each other in order to achieve the holographic function as a whole. Accordingly, the patterns of the diffraction gratings to be formed on these holograms can be determined by optimization based on ray tracing by a computer.

Figure 16:
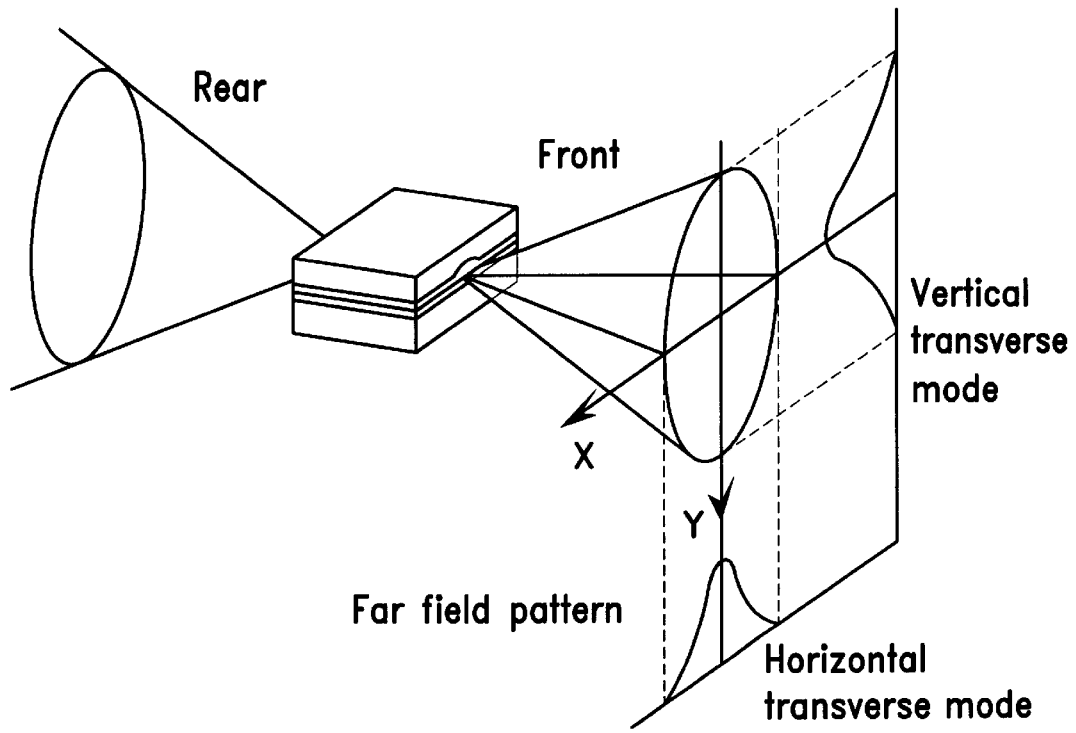
FIG. 16 is a view showing a characteristic of a semiconductor laser.
Figure 16:
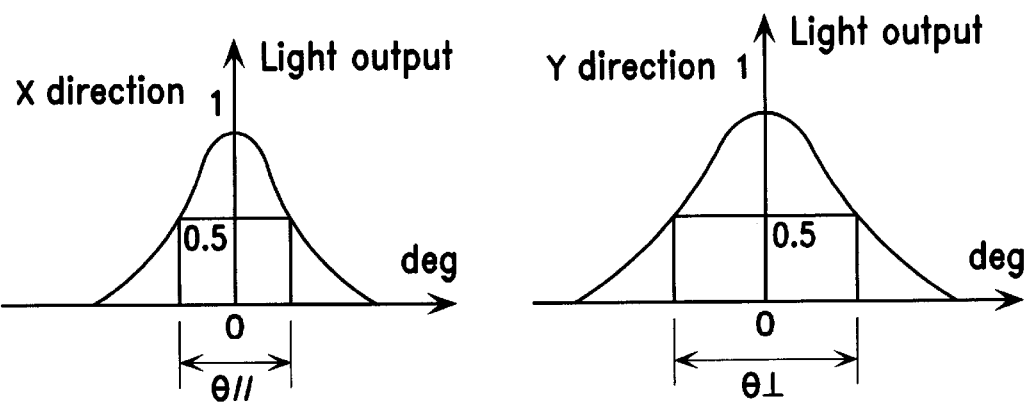

FIG. 16 shows a characteristic of a general semiconductor laser. As is apparent from FIG. 16, the light beam 10 emitted from the semiconductor laser 16 is divergent light and the beam shape is elliptically elongated in the Y direction (though the optical axis of the light beam is bent by the intervening optical system including the front hologram 2, the scanning hologram 6, and the mirror 8, the relation of the X direction and the Y direction with regard to the optical axis does not change).

Referring to FIG. 15 again, the divergent light beam 10 emitted from the semiconductor laser 16 is made parallel by the collimator lens 5 for the purpose of minimizing aberration of the resultant light beam on the scanning plane 9. Unlike the conventional case, the radius of the collimator lens 5 is set to be larger than the radius of the light beam 10 at the short axis thereof, so that the truncation of the light beam 10 by the collimator lens 5 is minimized. As a result, the beam shape of the light beam 10 passing through the collimator lens 5 is still elliptical but more round by being a little truncated. The light beam 10 is then shaped by the triangular prism 20 so that the beam shape of the light beam 10 is substantially completely round when it is introduced to the scanning hologram 6.

Figure 17:
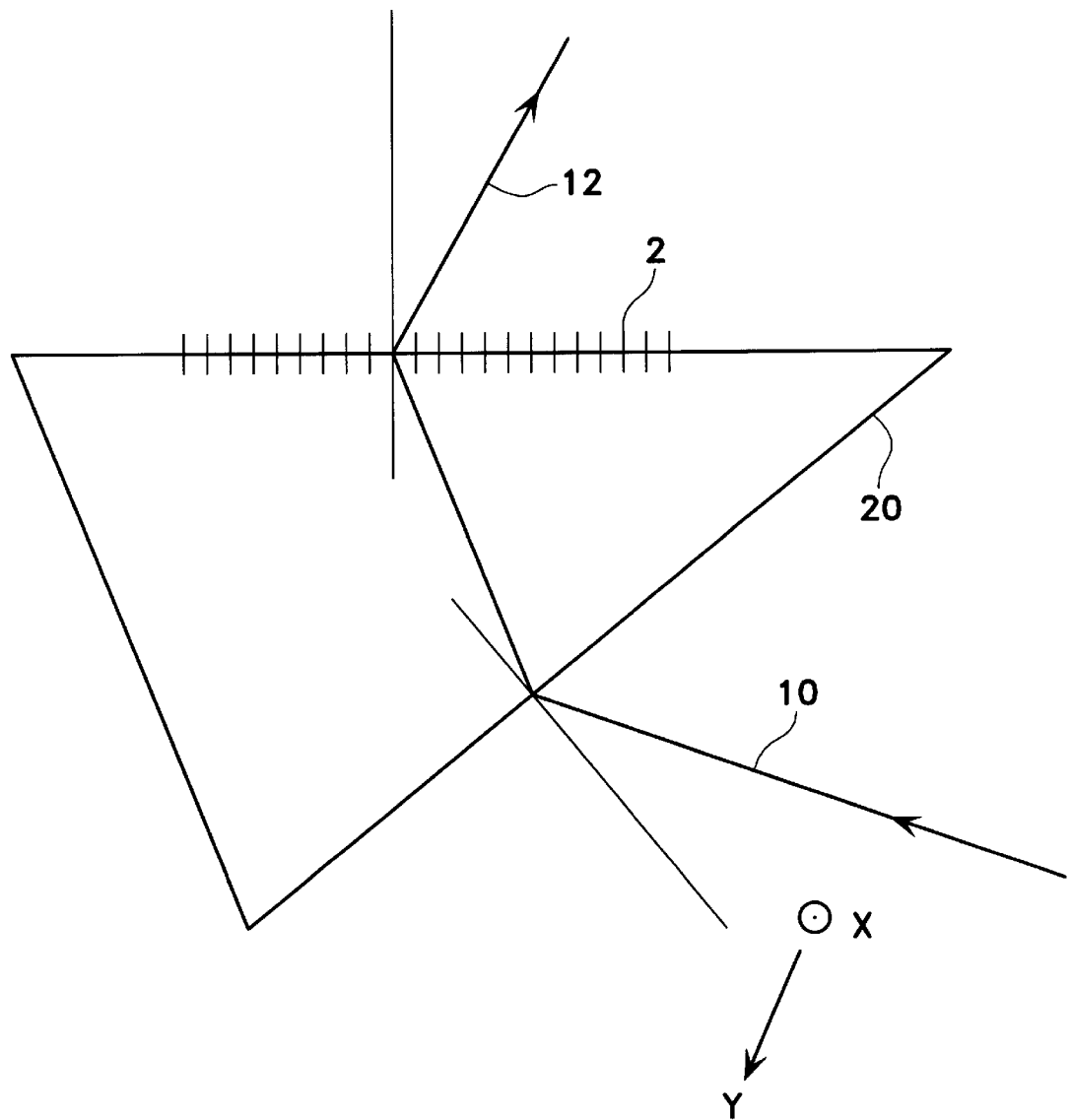
FIG. 17 is a view showing an optical path of a light beam passing through a triangular prism for the fifth example of the holographic scanner.

FIG. 17 shows an optical path of the light beam 10 through the triangular prism 20. The relation between the X and Y directions of the light beam 10 and the triangular prism 20 is as shown by the arrow in FIG. 17. The beam shape of the light beam 10 incident to the triangular prism 20 is elliptically elongated in the Y direction as mentioned above. The triangular prism 20 refracts the Y-direction component of the light beam 10, but not the X-direction component thereof. This results in that, after having passed through the triangular prism 20, the light beam 10 has a beam shape substantially completely round.

Since the shape of the first diffracted beam 12 incident to the scanning hologram 6 is not elliptically elongated in the Y direction, the resultant spot shapes of the third diffracted beam 14 at the scan center and the scan ends on the scanning plane 9 are not so significantly different. Moreover, since the light beam 10 is shaped by the triangular prism 20, not being truncated by the collimator lens 5 in a large amount as is conventionally done, optical loss at the beam shaping can be minimized.

Referring to FIG. 2, an optical path of the principal ray at the scan center on the meridional plane (the Y-Z plane) for holographic scanner of this example will be described. The light beam 10 incident to the triangular prism 20 is diffracted from the front hologram 2 as the first diffracted beam 12 at a diffraction angle A leftward with regard to the direction of the light beam 10. The first diffracted beam 12 is introduced to the rotary scanning hologram 6 and diffracted therefrom as the second diffracted beam 13 at a diffraction angle B rightward with regard to the direction of the first diffracted beam 12. At each of the above diffractions, the incident angle and the diffraction angle are set to substantially satisfy the Bragg condition, i.e., to be substantially equal to each other.

Since the diffraction angle B is smaller than the diffraction angle A, the direction of the third diffracted beam 14 from the rear hologram 3 is right with regard to the direction of the second diffracted beam 13, which is the same as that of the second diffracted beam 13 from the scanning hologram 6. With this configuration, the deviation of the image formation point on the scanning plane 9 in the Y direction caused by the variation of the wavelength of the light beam emitted from the semiconductor laser 16 can be minimized. This has been confirmed by ray tracing.

Referring to FIG. 7, an optical path of the principal ray on the sagittal plane (X-Z plane) for the holographic scanner of this example will be described. In this figure, the direction of the third diffracted beam 14 from the rear hologram 3 is made in reverse of that of the second diffracted beam 13 from the scanning hologram 6, so that the rear hologram 3 is provided with the converging power. As a result, the optical path length can be shortened and the deviation of the image formation point in the primary scanning direction (the X direction) caused by the variation of the wavelength of the light beam emitted from the light source can be minimized. This has been confirmed by ray tracing.

Thus, according to the holographic scanner of this example, since the triangular prism 20 is used for shaping the light beam emitted from the semiconductor laser 16, the loss of light energy can be minimized and therefore a low-output semiconductor laser can be used. Further, the triangular prism 20 used for this purpose can be an inexpensive one, not an expensive one such as a dispersive prism having high sensitivity to the wavelength of the light beam. This contributes to cost reduction. Moreover, since the front hologram 2 is attached to one face of the triangular prism 20, it can be easily manufactured, and no special support member for positioning the front hologram 2 at a predetermined angle is required. This also contributes to cost reduction.

The holographic scanner of this example may have a configuration different from the one described above. For example, the rear hologram and/or collimator lens can be omitted. A light source other than the semiconductor laser may be used. Also, the front hologram may be attached to another side of the triangular prism so that it faces the light source.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A holographic scanner for scanning a scanning surface with a scan beam, comprising:

a light source for emitting light;

a front hologram for diffracting said light emitted from said light source to produce a first diffracted beam;

a rotary hologram disk having a disk plane and being rotatable around an axis thereof vertical to said disk plane, said rotary hologram disk including a plurality of scanning holograms arranged in a circumferential direction on said disk plane, said scanning holograms diffracting said first diffracted beam to produce a second diffracted beam; and a rear hologram for diffracting said second diffracted beam to produce a third diffracted beam, said third diffracted beam being used as said scan beam for scanning said scanning surface, said rear hologram having a diffraction grating of which fringes are concentric and blazed.

2. A holographic scanner according to claim 1, wherein a spot shape of said first diffracted beam is elliptically elongated in the optical scanning direction, and first diffracted beam is introduced to said scanning holograms so that a spot shape on said scanning holograms becomes substantially round.

3. A holographic scanner according to claim 2, wherein said light source produces light which has a spot shape elliptically elongated in the optical scanning direction.

4. A holographic scanner according to claim 3, wherein said light source is a semiconductor laser, an outlet opening of said semiconductor laser having an elongated shape.

5. A holographic scanner according to claim 2, further comprising light shaping means for receiving said light emitted from said light source and shaping said light so that said spot shape of said first diffracted beam is elliptically elongated in the optical scanning direction, said light shaping means being provided between said light source and said front hologram.

6. A holographic scanner according to claim 5, wherein said light shaping means is a prism.

7. A holographic scanner according to claim 1, further comprising light shaping means for receiving said light emitted from said light source and shaping said light so that a spot shape of said first diffracted beam is elliptically elongated in the optical scanning direction, said light shaping means being provided between said light source and said scanning holograms, wherein said light shaping means is a triangular prism and said front hologram is disposed on a surface of said triangular prism.

8. A holographic scanner according to claim 1, wherein a grafting pitch of said scanning holograms in a radial direction is substantially uniform, and wherein a spot shape of said first diffracted beam is elliptically elongated in the optical scanning direction, and said first diffracted beam is introduced to said scanning holograms so that a spot shape on said scanning holograms becomes substantially round.

9. A holographic scanner according to claim 8, wherein said light source produces light which has a spot shape elliptically elongated in the optical scanning direction.

10. A holographic scanner according to claim 9, wherein said light source is a semiconductor laser, an outlet opening of said semiconductor laser having an elongated shape.

11. A holographic scanner according to claim 8, further comprising light shaping means for receiving said light emitted from said light source and shaping said light so that said spot shape of said first diffracted beam is elliptically elongated in the optical scanning direction, said light shaping means being provided between said light source and said front hologram.

12. A holographic scanner according to claim 11, wherein said light shaping means is a prism.

13. A holographic scanner according to claim 1, wherein a grafting pitch of said scanning holograms in a radial direction is substantially uniform, and wherein the holographic scanner further comprises light shaping means for receiving said light emitted from said light source and shaping said light so that a spot shape of said first diffracted beam is elliptically elongated in the optical scanning direction, said light shaping means being provided between said light source and said scanning holograms, said light shaping means being a triangular prism and said front hologram being disposed on a surface of said triangular prism.

14. A holographic scanner according to claim 1, wherein an angle made between said second diffracted beam and said first diffracted beam and an angle made between said third diffracted beam and said second diffracted beam have signs opposite to each other, measured clockwise, on a sagittal plane on said scanning surface, said third diffracted beam being used as said scan beam for scanning said scanning surface.

15. A holographic scanner according to claim 1, wherein said rear hologram has a converging power.

16. A holographic scanner according to claim 1, wherein a grating pitch of said scanning holograms in a radial direction is substantially uniform.

* * * * *